Aug. 5, 1952

A. F. PITYO ET AL 2,605,537

MACHINE FOR FORMING AND WELDING PARTS

Filed Jan. 15, 1948

Inventor
Albert F. Pityo
Harry E. Butterfield, Jr.
By
Attorney

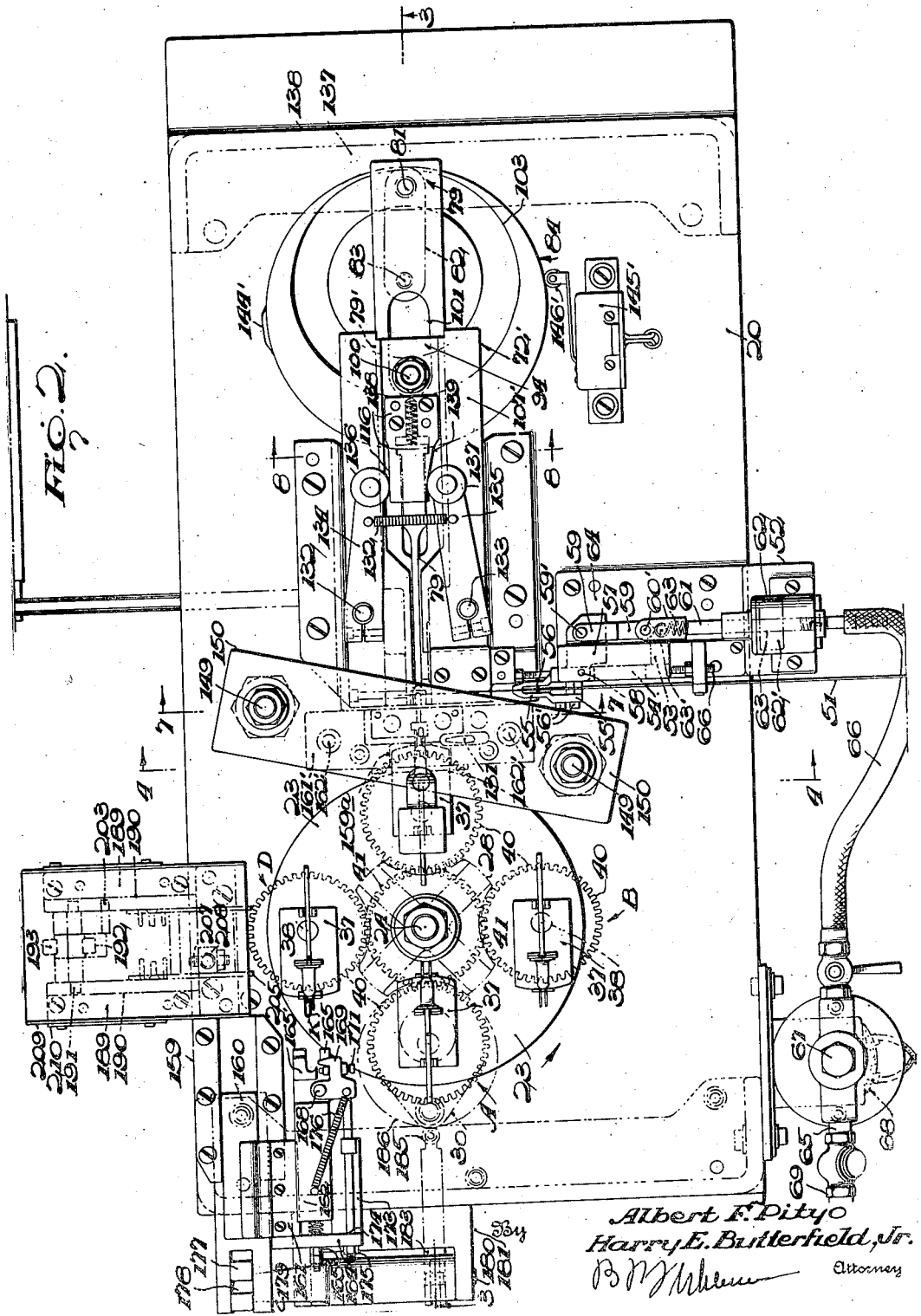

Aug. 5, 1952     A. F. PITYO ET AL     2,605,537
MACHINE FOR FORMING AND WELDING PARTS
Filed Jan. 15, 1948     15 Sheets-Sheet 3
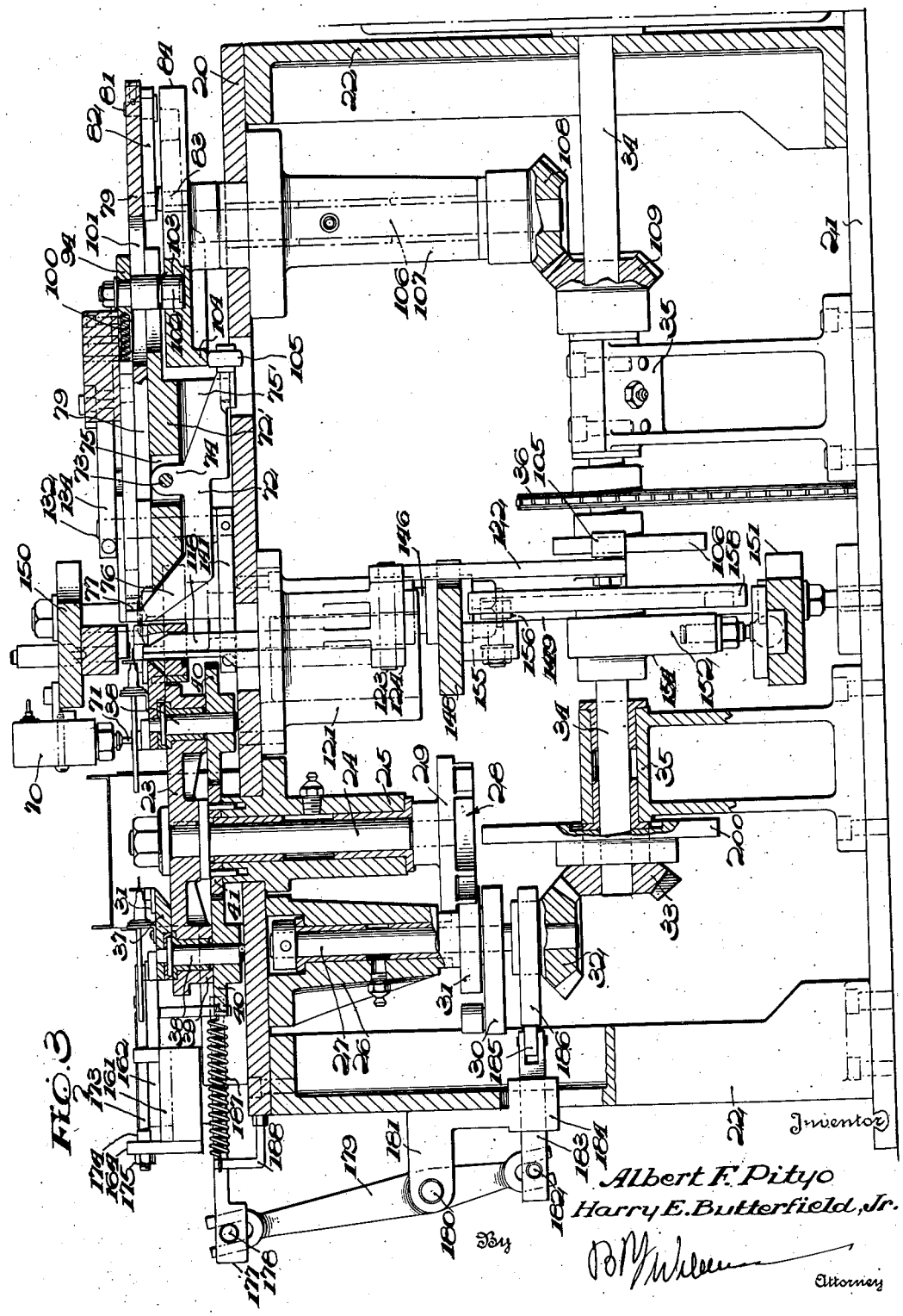
Inventor
Albert F. Pityo
Harry E. Butterfield, Jr.
By
Attorney

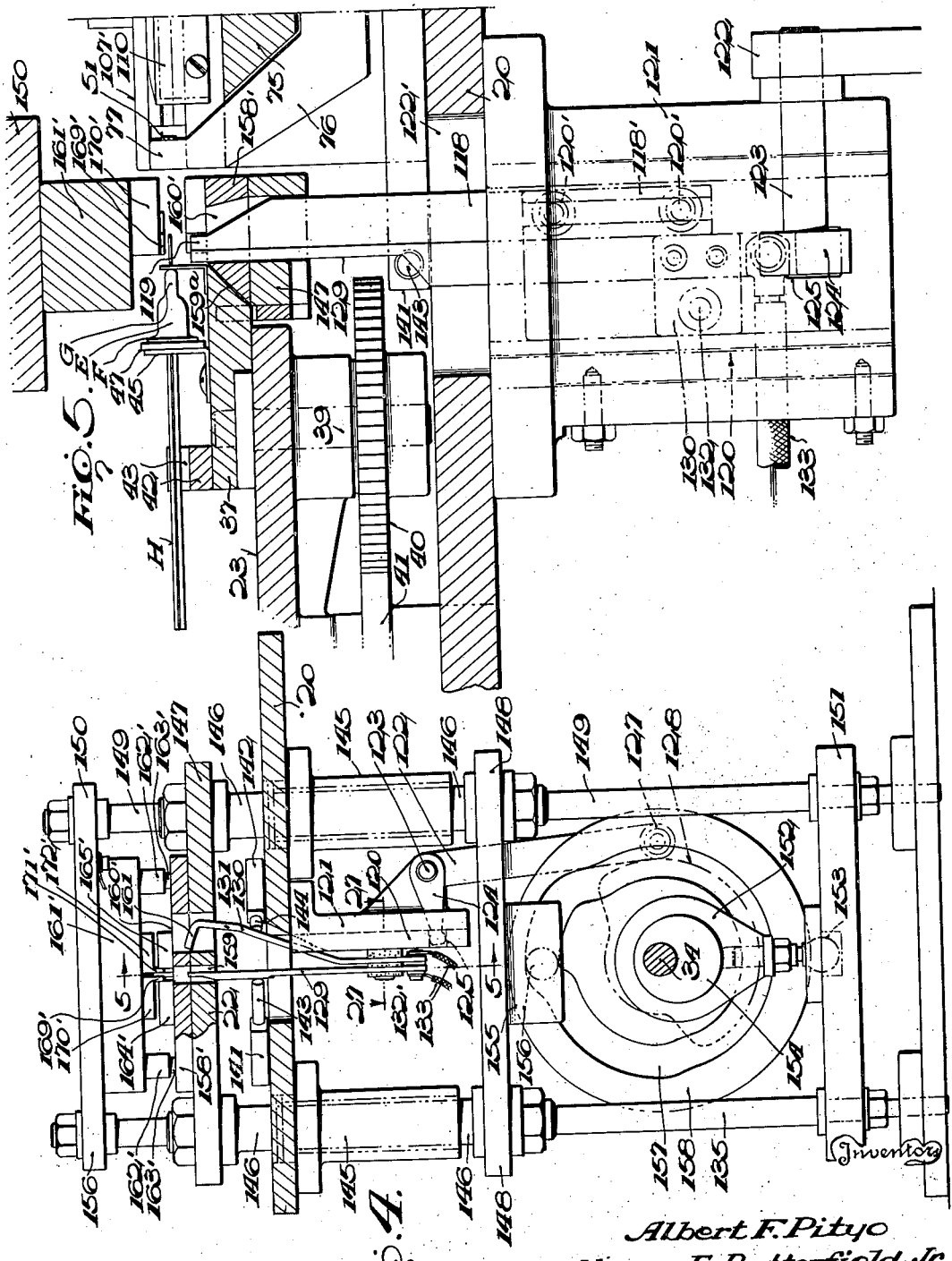

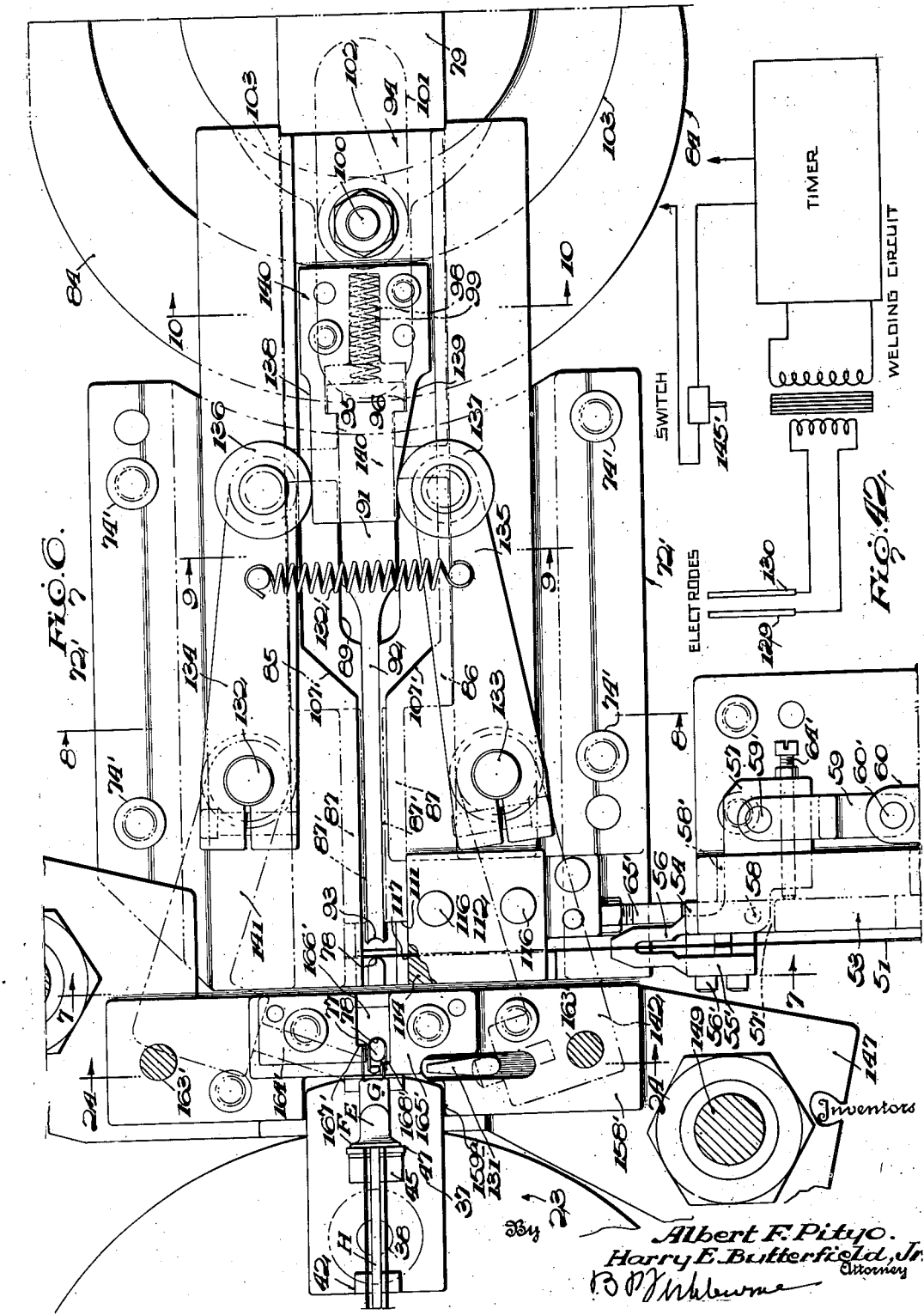

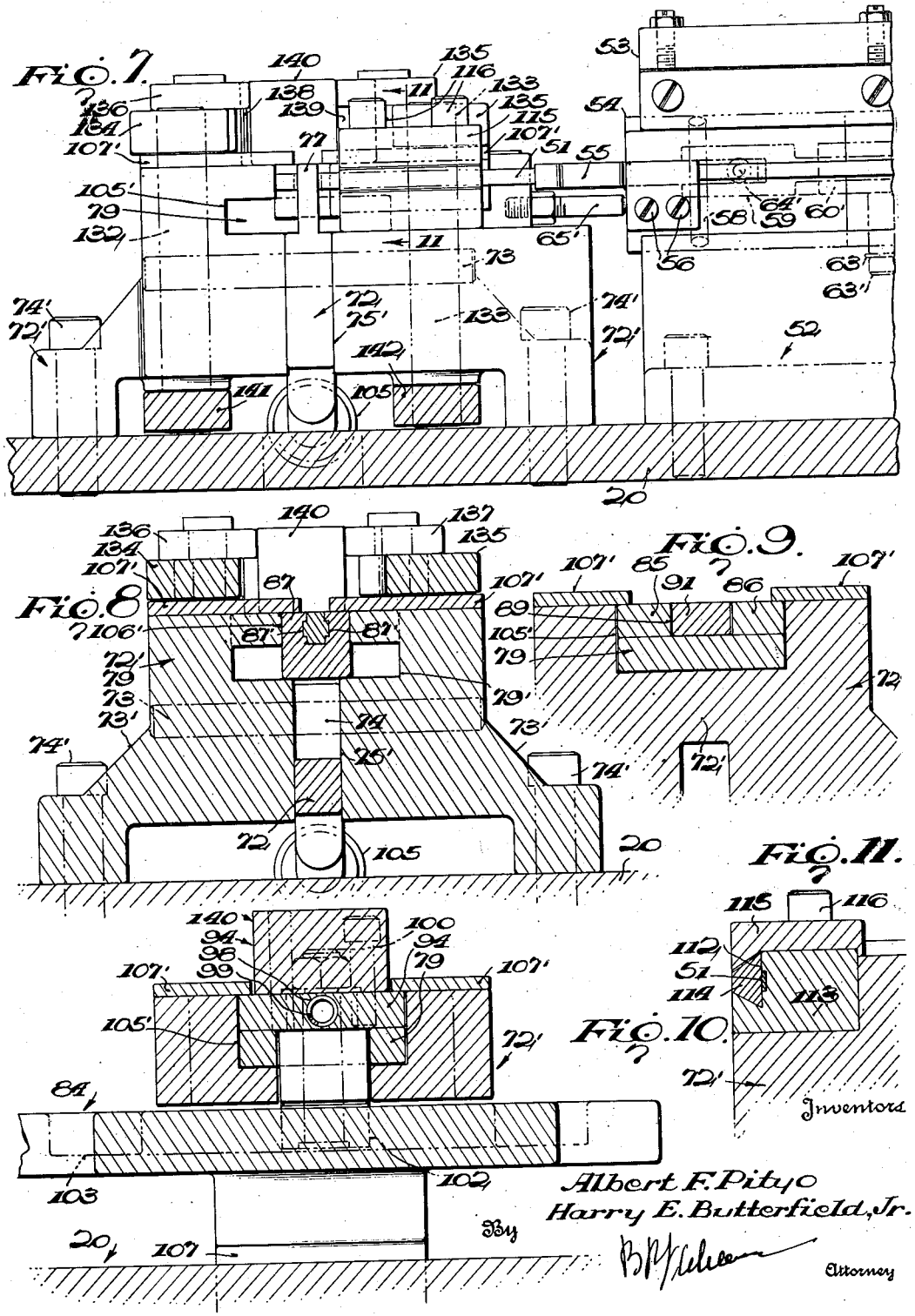

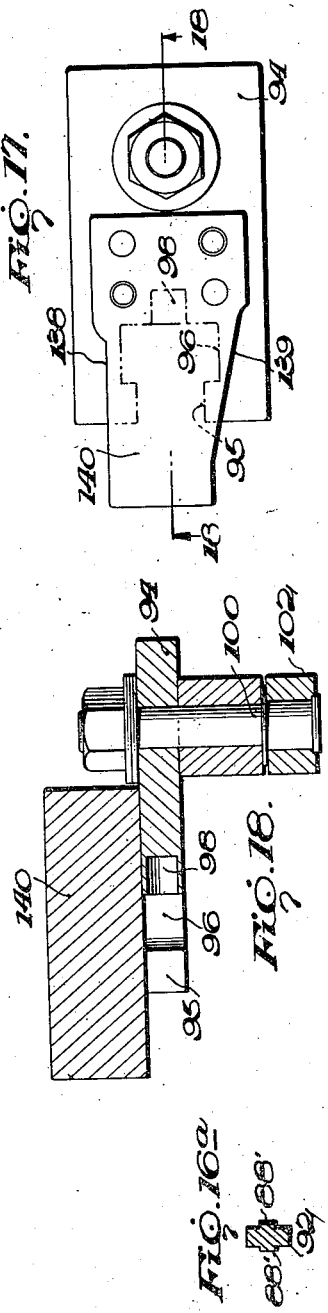
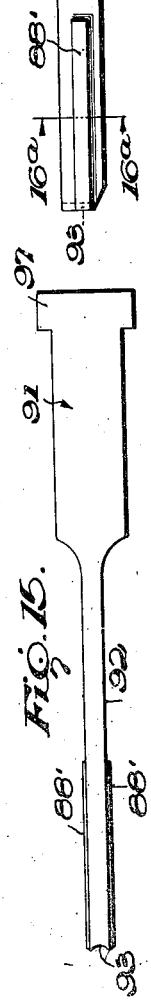
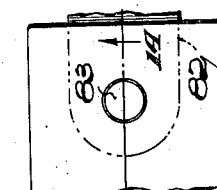
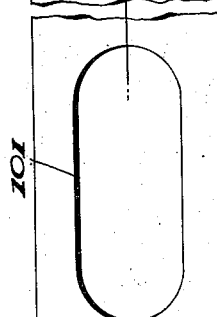
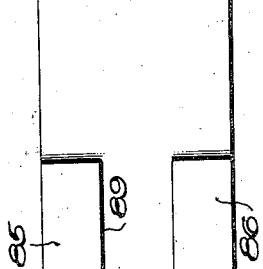
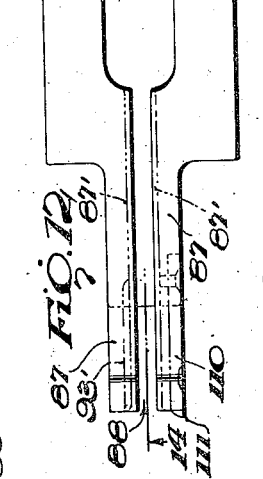
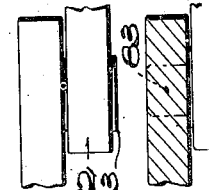
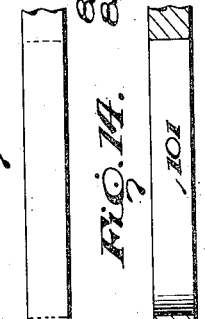
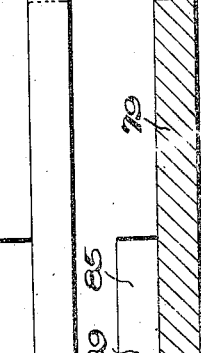
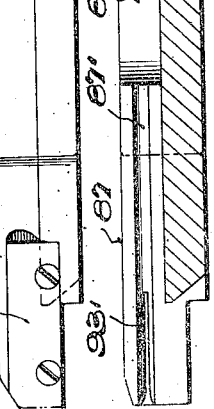

Aug. 5, 1952 A. F. PITYO ET AL 2,605,537
MACHINE FOR FORMING AND WELDING PARTS
Filed Jan. 15, 1948 15 Sheets-Sheet 8
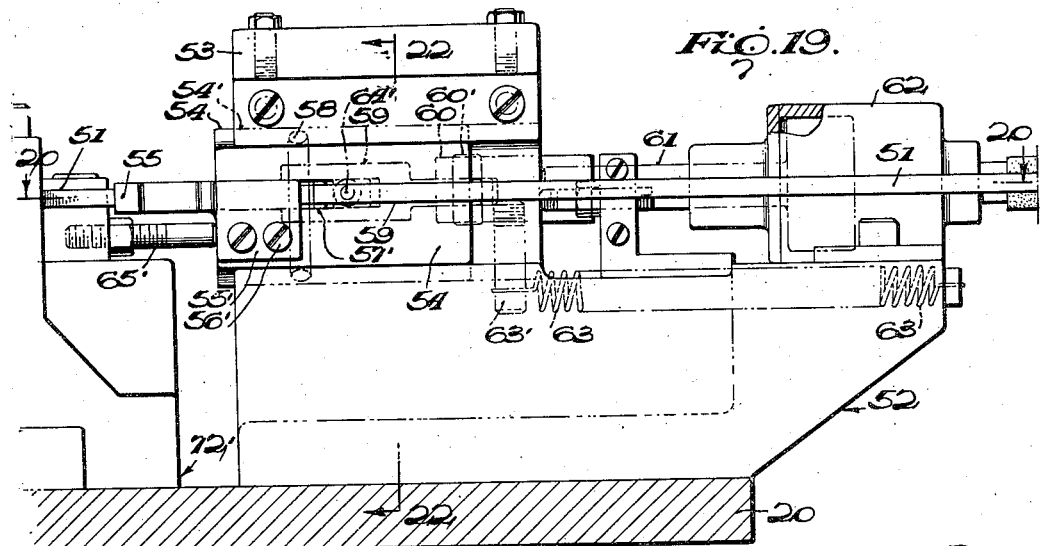
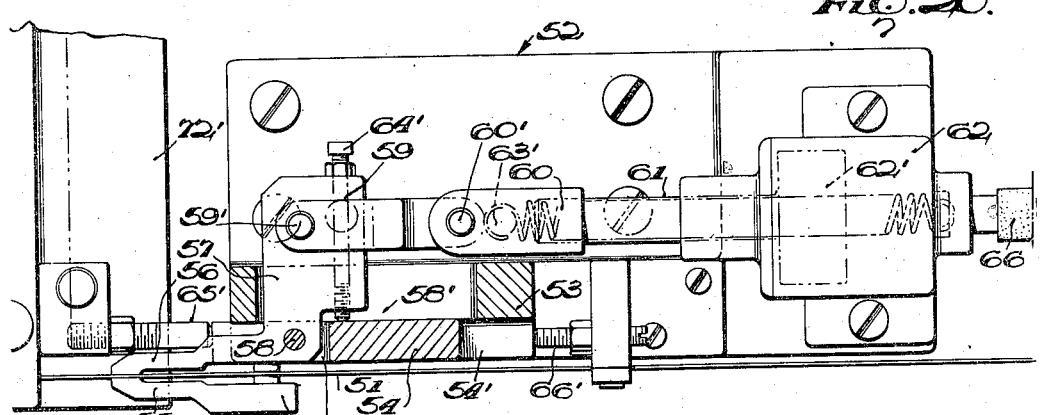
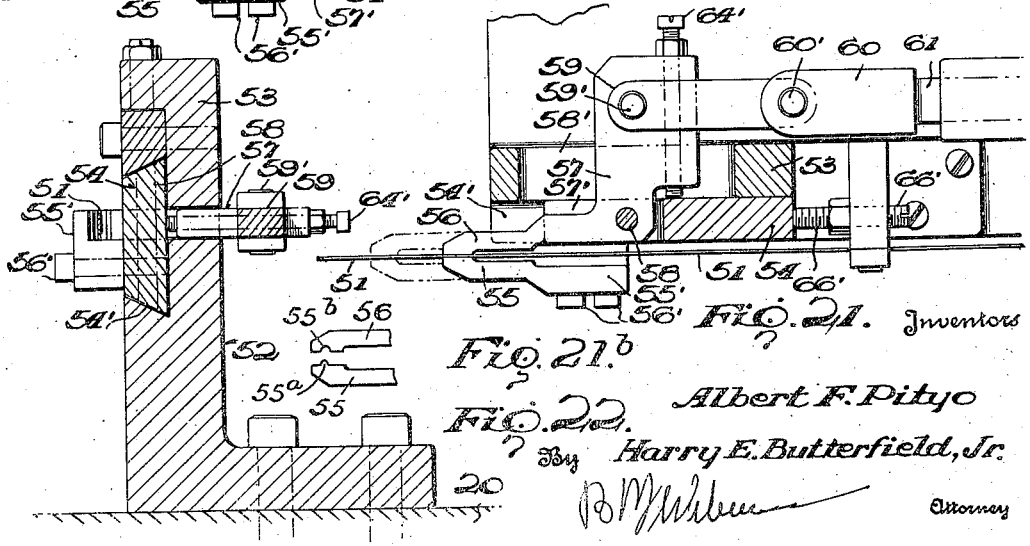
Inventors
Albert F. Pityo
Harry E. Butterfield, Jr.
By B. M. Wilson
Attorney

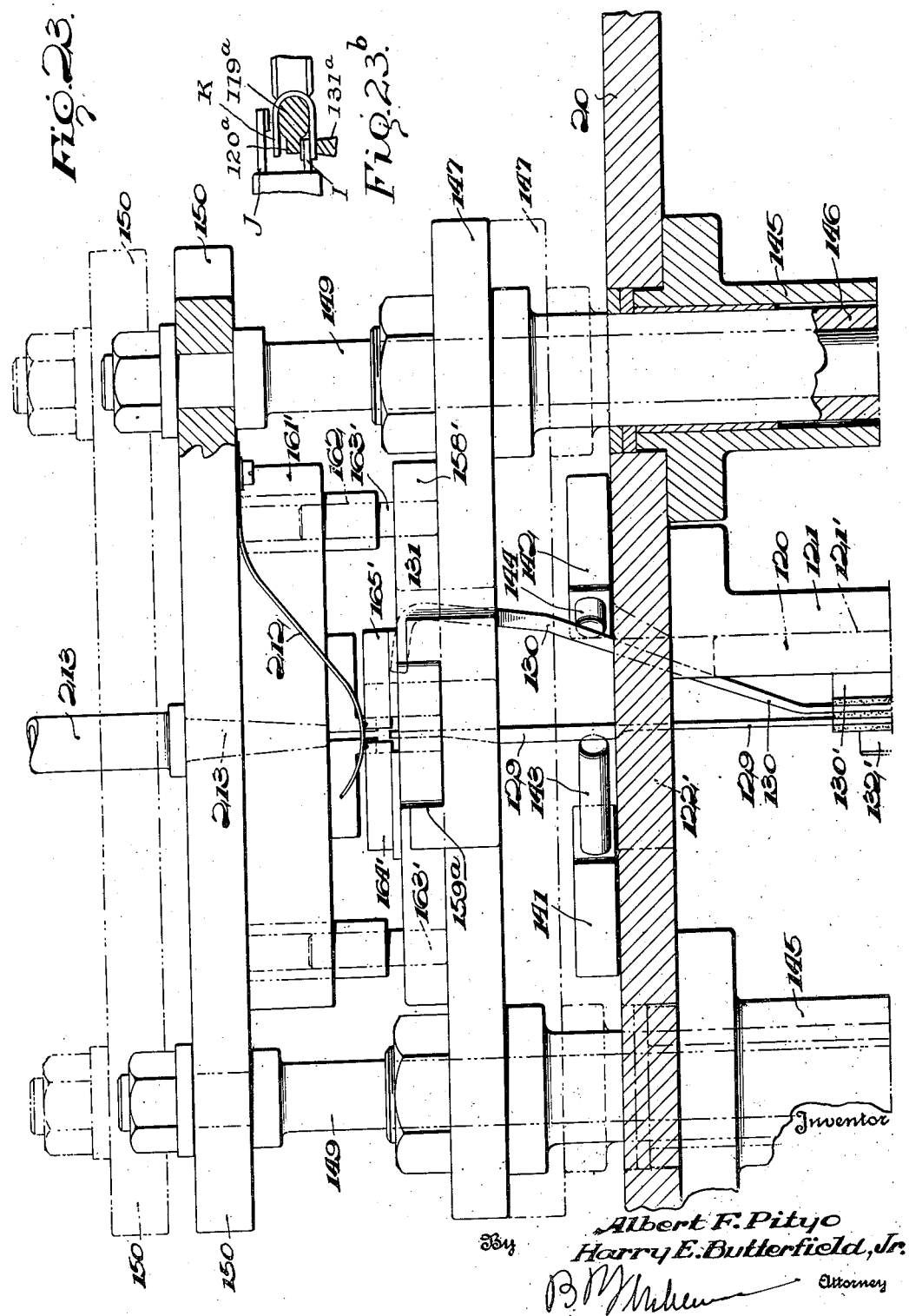

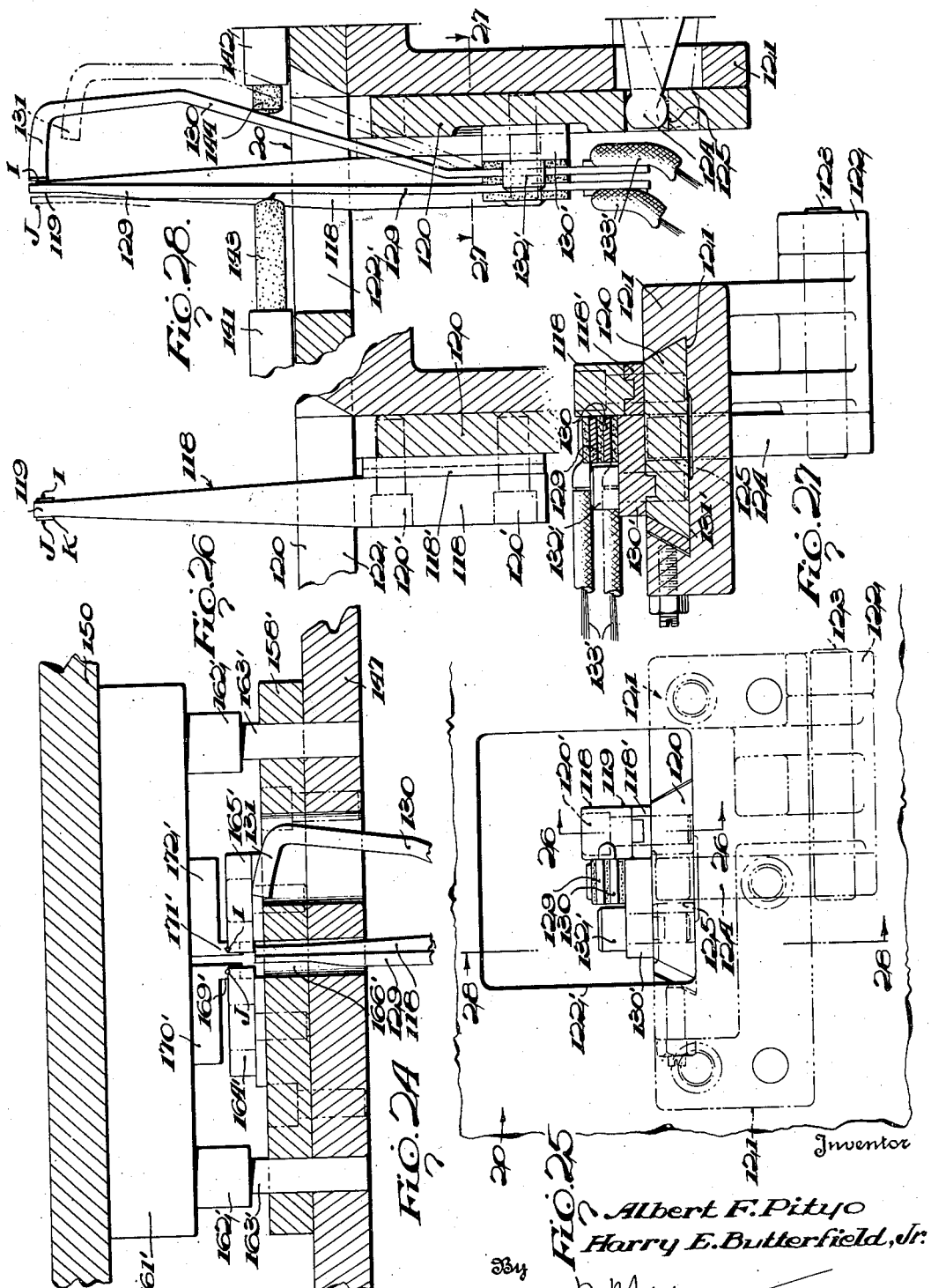

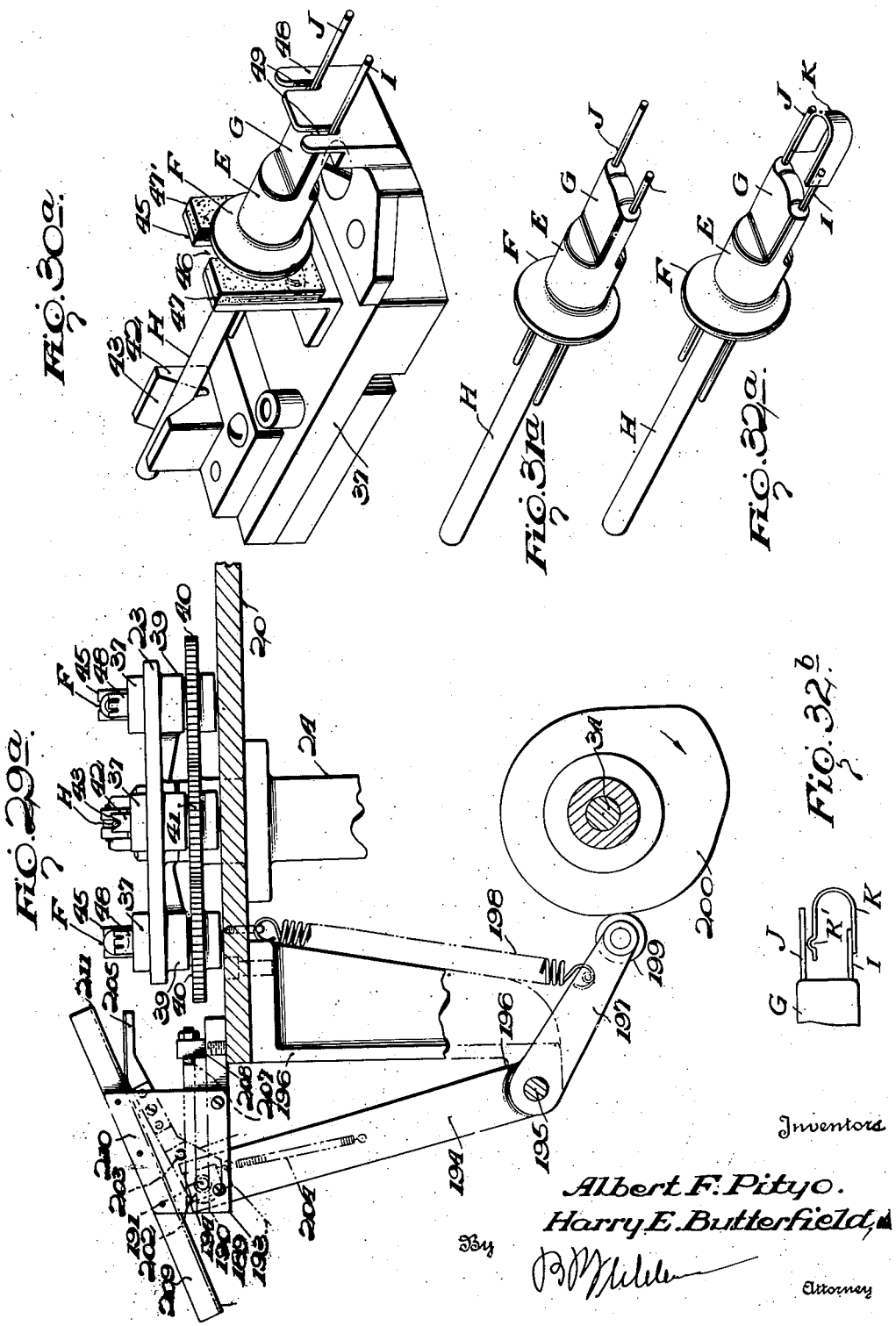

Aug. 5, 1952 A. F. PITYO ET AL 2,605,537
MACHINE FOR FORMING AND WELDING PARTS
Filed Jan. 15, 1948 15 Sheets-Sheet 12
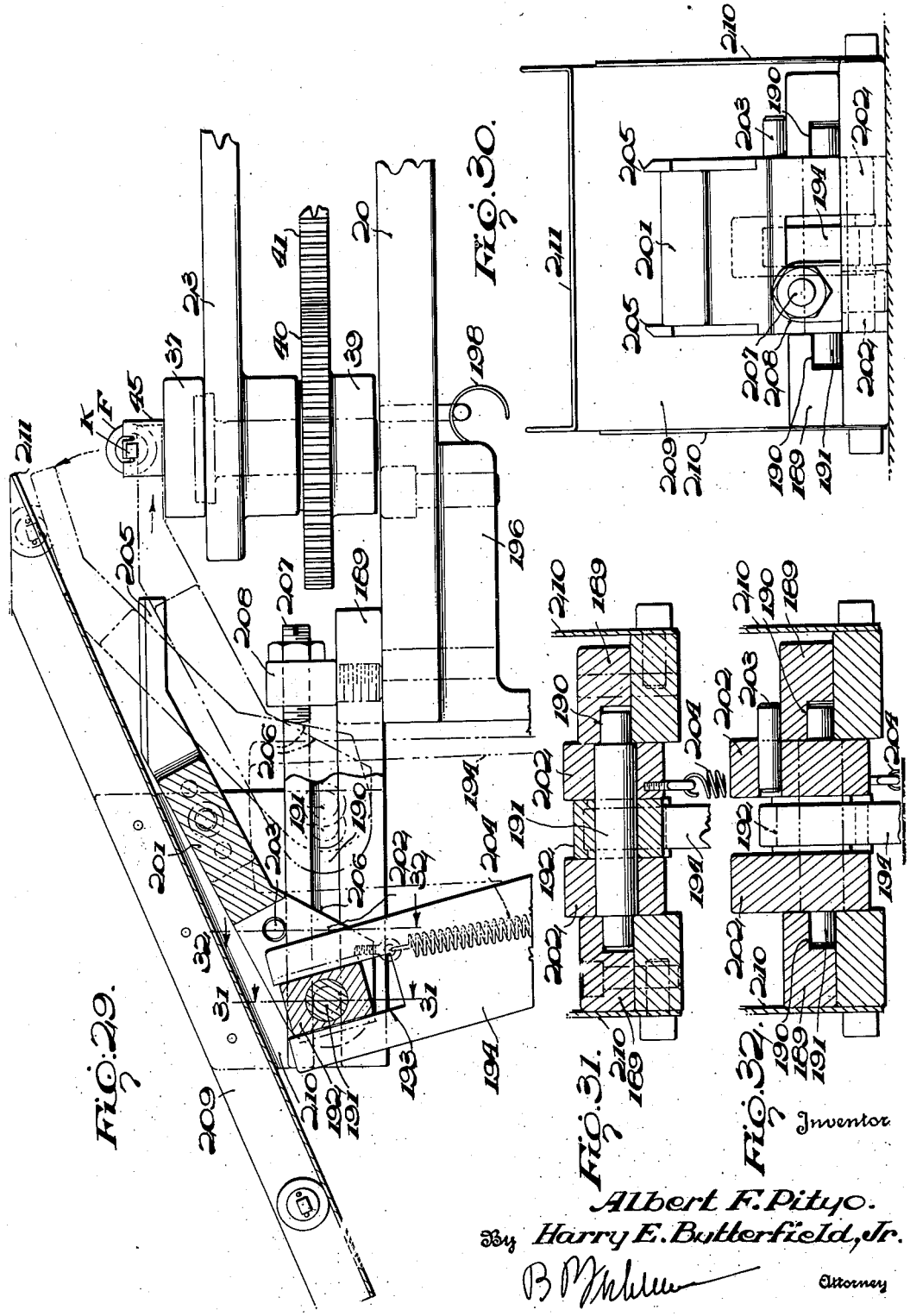
Inventor
Albert F. Pityo.
Harry E. Butterfield, Jr.
By B. M. Miller
Attorney

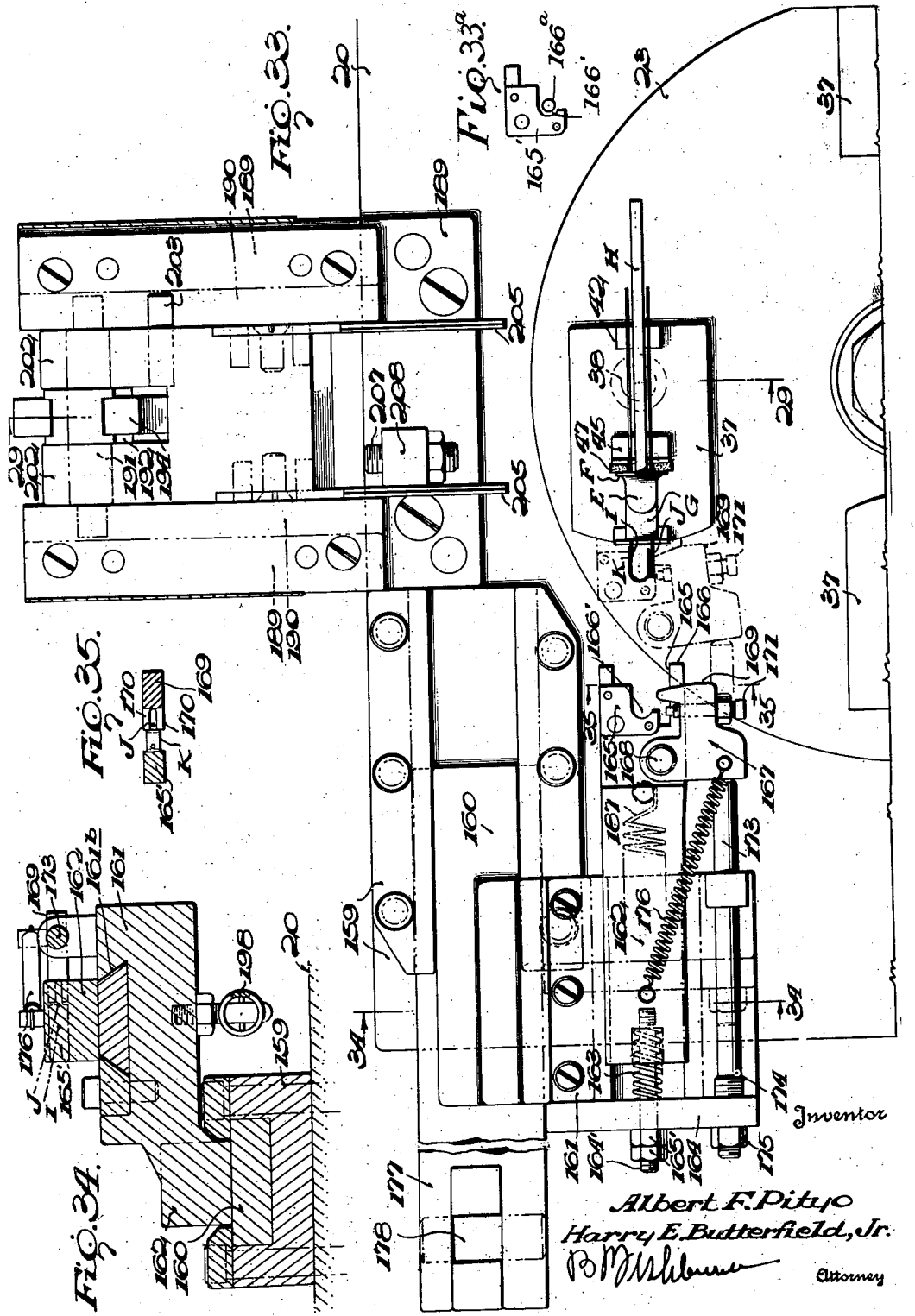

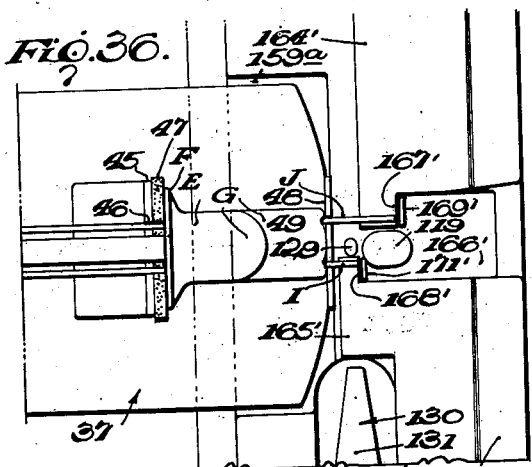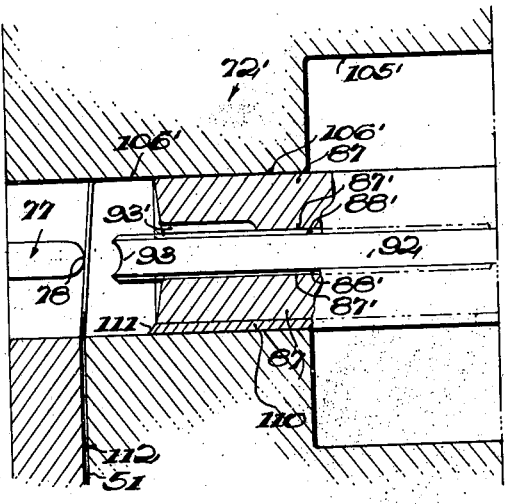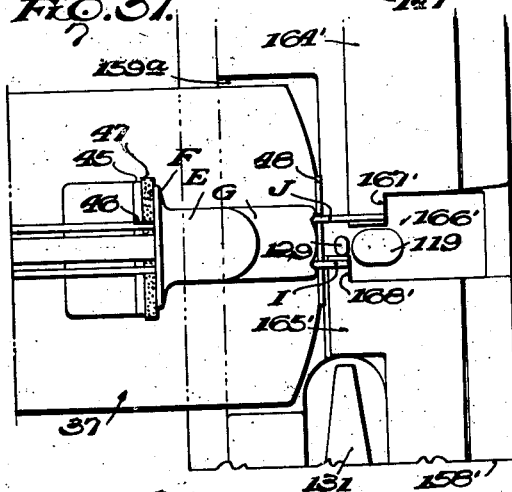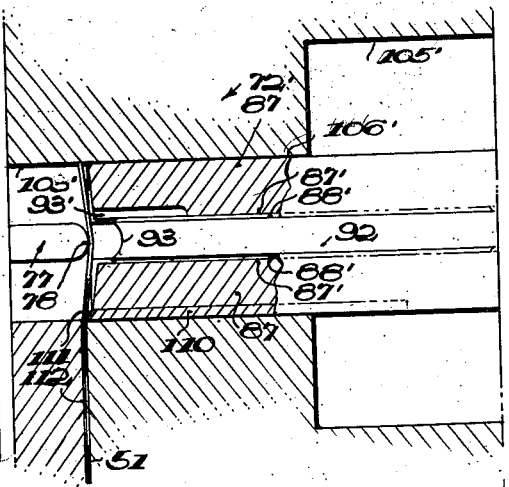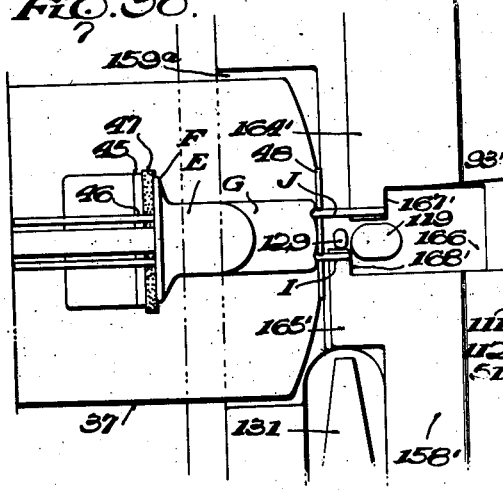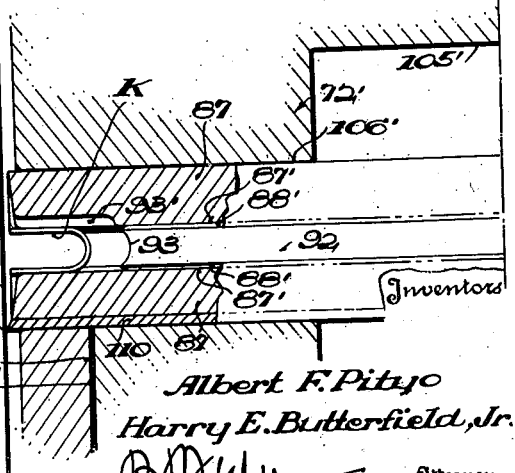

Aug. 5, 1952        A. F. PITYO ET AL        2,605,537
MACHINE FOR FORMING AND WELDING PARTS
Filed Jan. 15, 1948        15 Sheets-Sheet 15
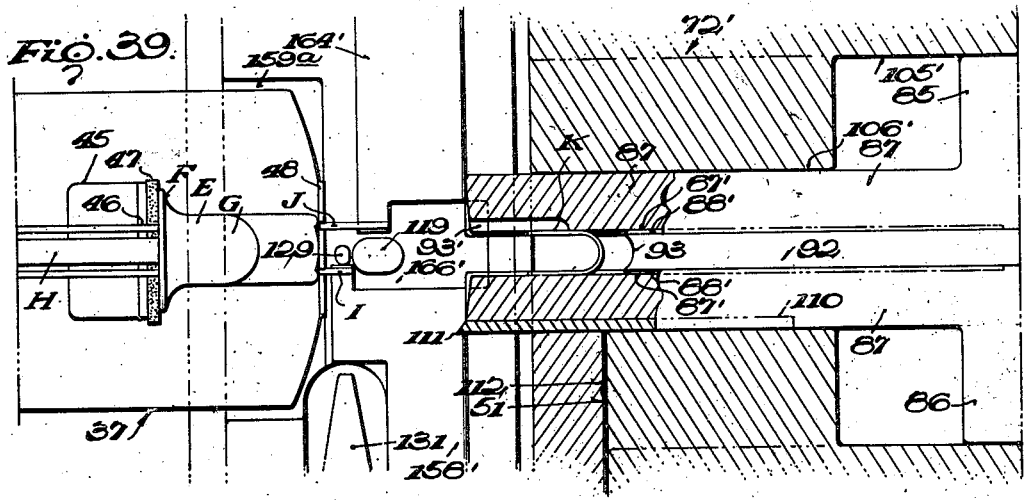
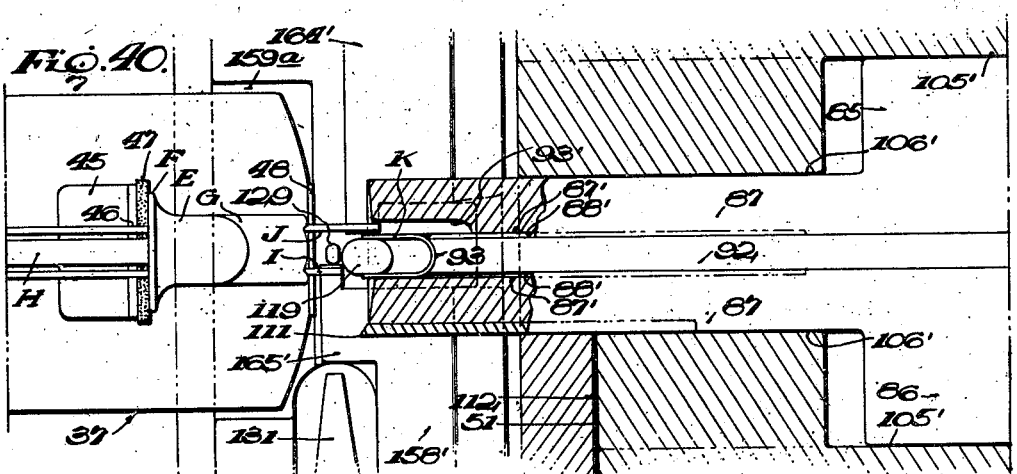
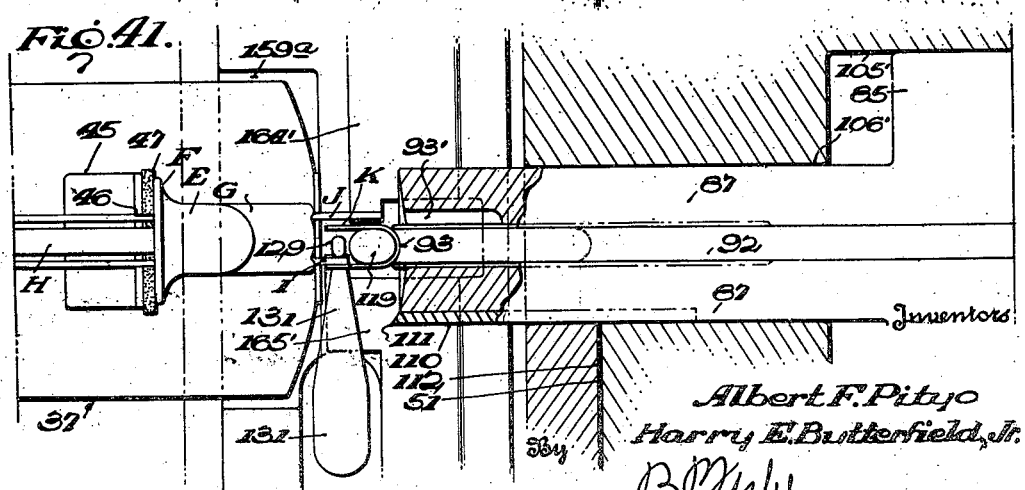

Patented Aug. 5, 1952

2,605,537

UNITED STATES PATENT OFFICE 2,605,537

MACHINE FOR FORMING AND WELDING PARTS

Albert F. Pityo, Clifton, and Harry E. Butterfield, Jr., Maplewood, N. J.

Application January 15, 1948, Serial No. 2,368

15 Claims. (Cl. 29—33)

Our invention relates to a machine for forming and welding parts.

An important object of the invention is to provide a machine of the above mentioned character which will form a generally U-shaped thermostatic element, arrange the same in proper relation to the wires of a stem and weld the thermostatic element to one wire.

A further object of the invention is to provide a machine of the above mentioned character, which will sever a section from a bimetal ribbon, form the section into the thermostatic element, and then weld the thermostatic element to one wire of the stem.

A further object of the invention is to provide a machine of the above mentioned character which will severe the wires of the stem, so that they will be in the proper lengths.

A further object of the invention is to provide means for bending, shaping, or sizing the thermostatic element after it is welded to one wire of the stem so that such element will be suitably spaced from the other wire of the stem.

A further object of the invention is to provide means to remove the article from the holder, after the completion of the operations, and convey the same to a remote point.

A further object of the invention is to provide a machine so constructed that the operator may conveniently feed the work to the work holding means.

A further object of the invention is to provide a machine of the above mentioned character, which is automatic in operation, and will perform the several operations in proper sequence.

Other objects and advantages of the invention will be apparent during the course of the following description.

In the accompanying drawings, forming a part of this application, and in which like numerals are employed to designate like parts throughout the same:

Figure 2 is a plan view of the same,

Figure 3 is a longitudinal vertical section taken on line 3—3 of Figure 2,

Figure 4 is a transverse vertical section taken on line 4—4 of Figure 2,

Figure 5 is a vertical section taken on line 5—5 of Figure 4,

Figure 1:
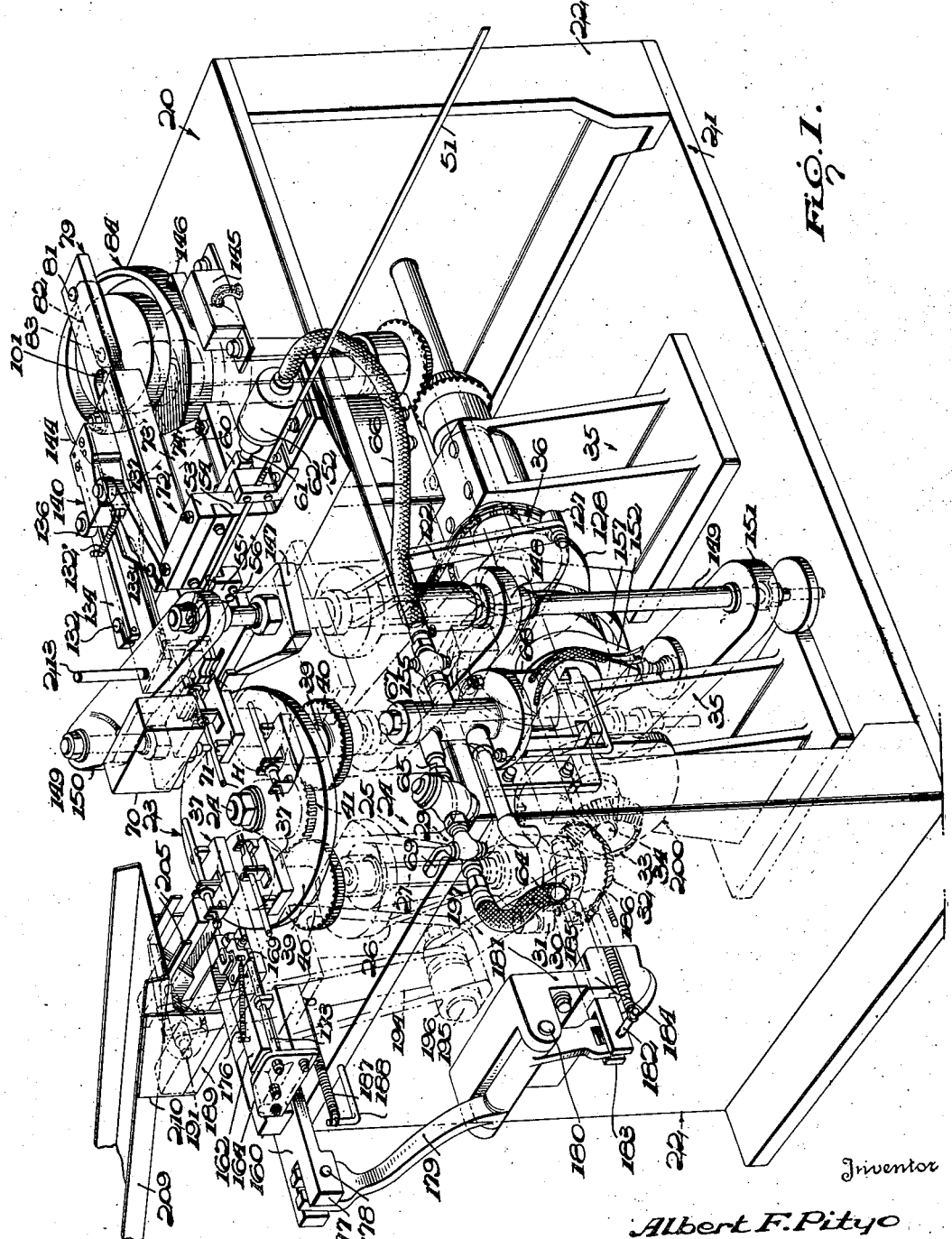
Figure 1 is a perspective view of a machine embodying our invention.

Figure 6 is an enlarged plan view of the machine, parts omitted and parts broken away, Figure 7 is a transverse section taken on line 7—7 of Figure 6, Figure 8 is a similar view taken on line 8—8 of Figure 6, Figure 9 is a similar view taken on line 9—9 of Figure 6, Figure 10 is a similar view taken on line 10—10 of Figure 6, Figure 11 is a vertical section taken on line 11—11 of Figure 7, Figure 12 is a plan view of a base slide, Figure 13 is a side elevation of the same, Figure 14 is a vertical longitudinal section taken on line 14—14 of Figure 12, Figure 15 is a plan view of a reciprocatory transfer element or plunger, Figure 16 is a side elevation of the same, Figure 16$^a$ is a transverse section taken on line 16$a$—16$a$ of Figure 16, Figure 17 is a plan view of an operating slide, Figure 18 is a vertical longitudinal section taken on line 18—18 of Figure 17, Figure 19 is a side elevation of the ribbon feed mechanism, Figure 20 is a horizontal section taken on line 20—20 of Figure 19, parts in elevation and the feed jaws in the forward position, Figure 21 is a view similar to Figure 20, with the feed jaws in the rear position, Figure 22 is a transverse vertical section taken on line 22—22 of Figure 19, Figure 21$^b$ is a fragmentary side elevation of the strip gripping jaws, showing a slight modification, Figure 23 is a side elevation of the wire severing mechanism, parts in section, Figure 24 is a transverse vertical section taken on line 24—24 of Figure 6, Figure 23$^b$ is a horizontal section through a modified form of arbor and electrode, associated elements being in elevation, Figure 25 is a plan view of the vertical movable slide which carries the arbor and welding electrodes, and associated elements, Figure 26 is a vertical section taken on line 26—26 of Figure 25, the arbor being shown in elevation, Figure 27 is a horizontal section taken on line 27—27 of Figure 28, Figure 28 is a vertical section taken on line 28—28 of Figure 25, Figure 29 is a vertical section taken on line 29—29 of Figure 33, Figure 30 is an end elevation of the article lifting and discharge mechanism, Figure 31 is a transverse vertical section taken on line 31—31 of Figure 29, Figure 32 is a similar view taken on line 32—32 of Figure 29, Figure 33 is a plan view of the sizing or bending mechanism and associated elements, Figure 34 is a transverse section taken on line 34—34 of Figure 33, Figure 35 is a transverse section taken on line 35—35 of Figure 33, Figure 33a is a plan view of the stationary block of the bending or sizing mechanism, shown in Figure 33, with an arbor associated therewith, Figure 29a is a side elevation of the work lifting and discharge mechanism, Figure 30a is a perspective view of one of the stem holding devices, and the stem held therein, Figure 31a is a perspective view of the stem or article before the thermostatic element is welded to the wire thereof, Figure 32a is a similar view showing the thermostatic element welded to the wire, Figure 32b is a plan view of the stem or article with the modified form of thermostatic element welded thereto, Figures 36 to 41 are plan views, partly diagrammatic, illustrating the several steps performed by the machine.

Figure 42 is a diagrammatic view of the welding circuit.

The machine comprises a frame including a horizontal top 20 and a horizontal bottom 21, rigidly connected by vertical ends 22, Figures 1 to 3.

Arranged above the top 20 is a horizontal rotatable turret 23, Figures 1, 2, 3, 6, and 29a, and this turret is rigidly secured to the upper end of a vertical shaft 24, journaled in a fixed bearing 25, suitably secured to the top 20. Arranged outwardly of and near the fixed bearing 25 is a fixed vertical bearing 26, rigidly attached to the top 20. The bearing 26 receives a vertical shaft 27. The shaft 27 drives the shaft 24 through the medium of a Geneva movement, of any well known or preferred type. This Geneva movement is designated generally by the numeral 28. The Geneva movement, Figure 3, includes a rotary driven element 29, rigidly mounted upon the shaft 24 and a rotary driving element 30 rigidly mounted upon the shaft 27 and the cam or locking element 31, rigidly mounted upon the shaft 27. For each rotation of the shaft 27 the Geneva movement turns the shaft 24 90° and then locks the same in the indexed position. The shaft 24 is indexed quickly, and is held stationary throughout the major portion of the turning of the shaft 27. The turret 23 is therefore indexed, and held stationary after each turning movement. Rigidly secured to the lower end of the vertical shaft 27 is a bevelled gear 32, driven by a bevelled gear 33 rigidly mounted upon a horizontal shaft 34, journaled in suitable bearings 35. This main drive shaft 34 receives rotation from a sprocket wheel 36, driven by any suitable means.

Arranged upon the upper face of the horizontal turret 23 is a plurality of article holding carriages 37, Figures 1, 2, 3, 6, 30a. Four carriages 37 are shown for the purpose of illustration, spaced 90°. These carriages are suitably rigidly secured to the upper ends of vertical shafts 38, Figure 3, included in planetary gearing. These vertical shafts are held within bearings 39, formed upon the turret 23. The shafts 38 extend below the bearings and are rigidly secured to planet gears 40, engaging and traveling about a stationary sun gear 41, fixed to the upper end of the bearing 25. As shown in Figure 2, when each carriage 37 is in the first or loading position A, it extends longitudinally of the top 20 and its leading end is forward. When the same carriage 37 is indexed 90° to the second or idling position B, it extends longitudinally of the top 20 but its leading end is rearward. When indexed to the third or working position C it extends longitudinally of the top 20 and its leading end is forward, corresponding to the loading position A. When indexed to the fourth or shaping and discharging position D, the carriage extends longitudinally of the top and its leading end is rearward, corresponding to the second or idling position B. As more clearly shown in Figures 2, 30a, 31a and 32a, the article or stem includes a cylindrical body portion E, usually formed of glass and provided with a flange F. The body portion E carries a flattened extension G and also carries a stem section H, both of which are formed of glass and are integral with the body portion E. Wires I and J are embedded in the body portion E and flattened portion G and extend outwardly beyond the flattened portion G and inwardly beyond the stem portion H. The wires I and J are parallel and spaced.

Each carriage 37 is provided with means for receiving and holding the article and stem. This means comprises a vertical block 42, mounted upon the top of the carriage 37 and rigidly secured to the carriage and having a V-shaped recess 43 for receiving the stem section H. The numeral 45 designates a vertical bracket, rigidly attached to the upper face of the carriage 37 and spaced longitudinally from the block 42 and having a vertical slot 46 to receive the stem section H and the inner ends of the wires I and J. The bracket 45 is provided upon its outer face with a rubber sheet 47', having a slot corresponding to the slot in the bracket 45 and in registration therewith and receiving the same parts as the slot of the bracket. The sheet 47' engages the flange F, and prevents breakage. Rigidly secured to the leading end of the carriage 37 is a vertical bracket 48, spaced longitudinally from the bracket 45, so that the body portion E and flat extension G may be arranged between the bracket 45 and bracket 48. These brackets are so spaced that the flat portion G will contact with the bracket 48 and the flange F will contact with the compressible rubber sheet 47 and the article will be properly held against perceptible longitudinal movement with relation to the carriage 37. The resilient or rubber sheet 47' presses the flat portion G against the bracket 48. Any other suitable yielding means may be employed to press the flat portion G against the bracket 48. The bracket 48 has vertical openings 49 to receive the forward ends of the wires I and J.

Mechanism is provided to feed the metal ribbon 51 longitudinally, Figures 1, 2, 3, 6, 19, 20, 21, 22. This mechanism includes a bracket 52, rigidly secured to the table top 20 and arranged at right angles to the longitudinal axis of the table top, and forwardly of the turret 23. The bracket 52 includes a vertical stationary guide 53, having a horizontal groove 54' formed upon one face thereof, and this horizontal groove receives a horizontally movable slide 54. The slide 54 has a stationary jaw 55, carried by a plate 55', which is rigidly secured to the slide 54, as shown at 56'. Arranged opposite the stationary jaw 55 is a movable jaw 56, carried by one arm of a bell crank lever 57, Figure 20. The bell crank lever is mounted within a slot 57' formed in the slide 54 and is pivoted upon a vertical pin 58, secured to the slide. so that the bell crank lever may swing horizontally. One arm of this bell crank lever is arranged within an elongated slot 58', formed in the stationary guide 53. The transverse arm of the bell crank lever is pivoted at 59' with a link 59, pivoted at 60' with a coupling 60, rigidly secured to a plunger rod 61. This plunger rod extends into a stationary cylinder 62, and is connected therein with a plunger 62'. This plunger is moved forwardly by compressed air. The plunger is moved in a reverse direction by a spring 63, attached to a pin 63', secured to the coupling 60, when the pressure is cut off from the cylinder 62, whereby the movable jaw 56 will open. The bimetal ribbon 51 is arranged between the jaws 55 and 56, and when the rod 61 moves forwardly, the jaw 56 first swings upon its pivot so that the bimetal ribbon is clamped between both jaws, and both jaws then move forwardly as a unit to feed the bimetal ribbon for a selected step. The swinging movement of the bell crank lever 57, to open the jaw 56, is regulated by an adjustable screw or stop 64', arranged to contact with the slide 54, and the forward movement of the slide 54 is regulated by an adjustable stop 65', and its rearward movement by an adjustable stop 66', Figure 20. We contemplate forming the stationary jaw 55, Figure 21b, with a projection or rib 55a, to enter a transverse groove 55b, formed in the movable jaw 56. This rib and groove serve to form a lateral projection K' upon the U-shaped thermostatic element K, to contact with the long wire J, Figure 32b.

The numeral 64 designates a hose, Figures 1 and 20, leading from a source of air pressure and this hose is connected with a pipe 65. The pipe 65 of a valve 67 which is biased closed. The pipe 66 leads to the cylinder 62. The valve element of the valve 67 is biased closed by a spring or the like and this valve element is opened when a solenoid winding 68 is energized. The pipe 65 may be equipped with valves 69 which may be manually turned to the opened or closed positions and are opened when the machine is in operation. Operating in conjunction with the solenoid winding 68 is a switch 70, Figure 3, connected in a circuit with the solenoid winding 68. The switch 70 is biased open and has a feeler finger 71 to engage with the stem section H, of the stem, if the stem is held by the work holding means. The entire microswitch 70 is vertically reciprocated, in a manner to be explained, and when it descends, the stem H is in its path of travel, and if the block is holding the stem section H, the feeler finger 71 will engage this stem and be moved upwardly with respect to the body of the switch. The switch will be closed and will close the circuit and the solenoid winding 68 will be energized. The valve 67 is now opened and compressed air will be supplied to the cylinder 62 and the jaws 55 and 56 will feed the bimetal ribbon forwardly a step. However, if the stem section H is not held within the block 42, the feeler finger 71 will not have the relative movement, and hence the valve 67 will remain closed, and the metal ribbon 51 will not be fed. This is important, as it eliminates the forming and cutting of short lengths of the bimetal ribbon, which would fall into the machine and might short circuit the electrodes or otherwise interfere with the operation of the machine. When the valve 67 is closed it exhausts the air from the cylinder 62 so that the spring 63 may return the plunger to the starting position.

Mechanism is provided to form generally U-shaped thermostatic elements K from the bimetal ribbon 51, Figure 32a. This mechanism comprises a table or block 72', having depending sides 73', Figures 3, 7, 8, 9, and 10, which are secured to the top 20 by bolts 74'. The table or block 72' has a longitudinal slot or passage 75', Figures 3 and 8, and this slot or passage receives a vertically swinging horn 72, carried by a pivot 73, passing through an apertured knuckle 74 of the horn, projecting into a slot 75, formed in the block or table 72', as more clearly shown in Figure 3. The horn 72 extends longitudinally of the top 20 at the central longitudinal axis of the top and swings in a vertical plane and has a vertically inclined portion 76, provided at its upper end with a vertical forming jaw 77, having a curved face 78, Figure 6.

The numeral 79, Figures 3, 7 to 10 inclusive, and 12 to 18 inclusive, designates a reciprocatory base slide, operating within a horizontal longitudinal passage 79' formed in the table or block 72', Figure 8. The base slide 79, Figures 2 and 3, has pivotal connection at 81 with a link 82, and this link is pivotally mounted upon a pin 83, eccentrically arranged upon a horizontal cam disc 84, whereby a rotation of the cam disc 84 will reciprocate the base slide 79.

Arranged upon the upper face of the base slide 79, see more particularly Figures 8, 9, and 12 to 14, are strips 85 and 86, rigidly secured to the base slide by any suitable means as by being formed integral therewith. The strips 85 and 86 extend longitudinally of the base slide 79 and carry forming bars 87, rigidly secured thereto and projecting forwardly beyond the base slide. The forming bars 87 are spaced to provide a reduced guide passage 88, and the strips 85 and 86 are spaced to provide a guide passage 89. A transfer element 91 is slidable within the guide passage 89 and has a forwardly extending reduced portion 92, operating within the guide passage 88. The reduced portion 92 has a rounded recess 93 at its forward end, Figure 15. The forming bars 87 are provided upon their inner faces at the guide passage 88 with longitudinal grooves 87', Figures 8 and 14, to receive tongues 88' formed upon the opposite faces of the reduced transfer portion 92, see more particularly Figures 8, 15, and 16a. The grooves 87' extend outwardly through the ends of the forming bars 87, Figure 12. The forming bar 87 to the right, Figures 14 and 39, is provided with an auxiliary groove 93' to receive the long wire J.

Slidably mounted upon the base slide 79 is a reciprocatory operating slide 94, Figures 3, 17, and 18, having a longitudinal slot 95 to receive the transfer element 91 and an enlarged transverse opening 96 to receive a cross head 97, formed upon the transfer element. The operating slide 94 has a longitudinal recess 98 for receiving a compressible coil spring 99, which bears against the cross head 97. The upper slide 94 is reciprocated by a pin 100, rigidly secured thereto and extending through an elongated opening 101 formed in the base slide 79. The pin carries a roller 102, which travels within an eccentric annular groove 103, formed in the cam disc 84. The cam disc 84 has a depending cam element 104, Figure 3, to engage a roller 105 mounted upon the rear end of the horn 72. The cam element 104 intermittently engages the roller 105 and thereby swings the horn upon its pivot to raise its forward end. The horn is biased so that its forward end automatically returns to the lowered position when the cam element disengages the roller 105. The strips 85 and 86, Figures 8 and 9, which are arranged above the base slide 79, operate within a guide passage 105' and the forming bars 87 operate within a guide passage 106', and plates 107' project inwardly over these passages and are secured to the table or block 72' by any suitable means. It is thus seen that the forming bars 87 and transfer element 91 are guided to reciprocate longitudinally of the top 20, and that the transfer element 91 is movable with relation to the forming bars 87.

The cam disc 84, Figure 3, is rigidly mounted upon the upper end of a vertical shaft 106, journaled in a fixed bearing 107. The shaft 106 has a bevelled gear 108 rigidly secured to its lower end and this bevelled gear is driven by a bevelled gear 109, rigidly mounted upon the shaft 34.

As more clearly shown in Figures 6, 11, 12, 13, and 37, one forming bar 87 has a blade or cutter 110 rigidly secured thereto and having a cutting edge 111.

The bimetal ribbon 51 is fed by the ribbon feeding mechanism through a groove 112, Figure 11, which may be formed in a block 113 and a blade or insert 114 is held in place by a cap 115, clamped in position by screws 116. The insert 114 provides a cutting edge or shoulder 117, for coaction with the cutting edge 111, Figure 6.

When the bimetal ribbon 51 is fed through the groove 112, it extends across the upstanding end 77 of the horn, Figures 6, 36, and 37, and is contacting with the curved face 78 of the horn, before the forming bars 87 move forwardly. When these bars move forwardly slightly they contact with the ribbon 51 and press the same against the face 78, and the ribbon is slightly bowed and enters the forward ends of the grooves 87' before it is severed by the edge 111 of the blade. Further forward movement of the forming arms 87 causes the ribbon to be severed and the severed ribbon section is formed about the horn extension 77 into the U-shaped element K, as will be more fully explained.

The numeral 118 designates a vertical arbor, which is vertically movable and has a reduced upper end 119. This vertical arbor is shown more clearly in Figures 5, and 25 to 28. The lower end of the vertical arbor 118 is mounted upon a block 118', Figure 27, and preferably has a tongue and groove connection with the block, and the arbor and block are rigidly clamped to a vertically movable slide 120 by means of screws 120'. The slide 120 operates within a groove 121' of a fixed guide 121, arranged beneath the table top 20, having an opening 122', Figure 5. The vertically movable slide 120, Figure 4, is raised and lowered by a bell crank lever 122, including a rock shaft 123 operating in a fixed bearing. This bell crank lever includes a short arm 124 operating within an opening 125 formed in the lower end of the slide 120, and a long arm 126, carrying a roller 127 at its lower end, engaging a cam 128, mounted upon the shaft 34.

After the stem or article is indexed by the turret to the working position C, the arbor 118 rises and its reduced end 119 is positioned between the wires I and J and project above the same. The forming bars 87 move forwardly to about the transverse center of the reduced end 119 of the arbor, and the U-shaped thermostatic element K surrounds the reduced end of the arbor. The transfer element 91 now moves forwardly and the curved recess 93 of its reduced end receives the end of the U-shaped element K and the transfer element yieldingly and firmly clamps the U-shaped element K to the rear face of the extension 119 of the arbor. The forming bars 87 remain in the forward position while the transfer element 91 clamps the U-shaped element to the arbor. After this the bars 87 and transfer element are retracted, but the transfer element moves faster.

Mechanism is provided to weld the U-shaped thermostatic element K to the short wire I of the stem. This mechanism includes vertically movable upstanding electrodes 129 and 130, which are suitably resilient. These electrodes are mounted upon a block 130' and insulated therefrom, and this block has a tongue and grooved connection with the slide 120 and the block is clamped to the slide 120 by a screw 132'. Wires 133' are connected with the electrodes and form a part of the welding circuit. The electrode 130 has a horizontal extension 131 at its upper end.

When the slide 120 is raised to elevate the arbor 118 the straight electrode 129 is disposed inwardly of the short wire I and the horizontal extension 131 of the electrode 130 is disposed outwardly of the short wire and opposite the electrode 129. When the electrodes are brought together the short wire and U-shaped thermostatic element K are pressed together and the welding occurs.

The welding electrodes 129 and 130 are resilient and are biased open. Means are provided to move the electrodes 129 and 130 toward each other, comprising vertical rock shafts 132 and 133, journaled in openings formed in the table 72'. These rock shafts have horizontal arms 134 and 135 rigidly secured to their upper ends, and these arms carry rollers 136 and 137. The roller 136 is arranged to engage the cam face 138 and the roller 137 cam face 139 of a cam block 140, rigidly mounted upon the operating slide 94, Figures 6, 17, and 18. The cam face 139 is inclined throughout the major portion of its length. The arms 134 and 135 are connected by a spring 132' which draws them together. Rigidly secured to the lower ends of the rock shafts 132 and 133 are arms 141 and 142, extending rearwardly, while the arms 134 and 135 extend forwardly, Figure 6. The arm 141 carries an insulating pin 143, see more particularly Figure 23, arranged to engage with the electrode 129, while the arm 142 carries an insulating pin 144, arranged to engage with the electrode 130, see also Figure 4. When the cam block 140 is moved to the left, Figure 6, the rollers 136 and 137 move apart, and the rock shafts 132 and 133 are turned, whereby the free ends of the arms 141 and 142 move together and the pins 143 and 144 shift the electrodes 129 and 130 to the inner position. When the electrodes 129 and 130 are in the inner position, Figure 41, these electrodes press the side of the U-shaped thermostatic element K against the short wire I and the welding circuit is closed so that the element K is welded to the short wire. The welding circuit is closed by a cam part 144', carried by the disc 84 and this cam part operates a microswitch 145', connected in the welding circuit, and thereby closes the welding circuit. The switch 145' is biased open and when the cam part 144' disengages the roller 146', the switch 145' will open the welding circuit, Figure 2. The welding circuit may be of any well known or preferred type and includes a suitable timer which will open the circuit independently of the micro switch 145', when the welding period is completed.

In Figure 23b, I have shown a modified form of welding mechanism. In this figure, the numeral 119ᵃ designates a vertically movable arbor corresponding to the arbor 118. The arbor 119ᵃ has an electrode 120ᵃ formed integral therewith. The numeral 131ᵃ designates a horizontal reciprocatory electrode. The U-shaped thermostatic element K is applied to the arbor 119ᵃ when the arbor is raised and the transfer element 92 presses the thermostatic element K upon the arbor 119ᵃ. The electrode 131ᵃ presses one end of the thermostatic element K against the short wire I, which bears against the electrode 120ᵃ. The welding circuit is closed and the elements I and K are welded together at their point of contact.

Mechanism is provided to sever the wires of the stem, Figure 30ᵃ, to provide the short and long wires I and J, Figure 31ᵃ. As more clearly shown in Figures 4 and 23, vertical tubular guides 145 are arranged beneath the table top 20 and rigidly secured thereto. These guides slidably receive vertical reciprocatory sleeves 146, having upper and lower cross heads 147 and 148 rigidly secured thereto. Slidable within the sleeves 146 are vertical reciprocatory rods 149, having upper and lower cross heads 150 and 151 rigidly connected therewith, as shown. The microswitch 70 is mounted upon the upper cross head 150, Figure 3. The cross heads 150 and 151 reciprocate as a unit, and for this purpose a cam strap 152 is connected with the cross head 151 by a ball and socket joint 153. The cam strap 152 engages a cam 154 rigidly mounted upon the shaft 34. The cross heads 147 and 148 move as a unit and to effect this movement the cross head 148 is provided with a depending block 155, rigidly connected therewith, and carrying a roller 156, operating within a cam groove 157, formed in a cam 158, rigidly mounted upon the shaft 34. The cross heads 150 and 147 move in opposite directions toward and from each other.

Mounted upon the cross head 147 is a block 158' having a recess 159ᵃ, to receive the carriage 37, see more particularly Figures 5 and 6. The cross head 147 and block 158' have vertical openings 159' and 160', formed therein, Figure 4. Mounted upon the cross head 150 is a block 161', carrying guide bushings 162', receiving pins 163', rigidly carried by the block 158'. Suitably detachably mounted upon the block 158' are dies 164' and 165', Figures 6, 4, 5, 23 and 36. These dies 164' and 165' when assembled form a large vertical passage 166', also extending through the block 158' and the cross head. The die 164' has a cutting edge 167', Figures 6 and 36, and the die 165' has a cutting edge 168'. A cutting blade 169' is arranged for coaction with the cutting edge 167', and is carried by a die 170' rigidly mounted upon the block 161', Figure 24. A blade 171' is arranged for coaction with the cutting edge 168' and is carried by a die 172' rigidly mounted upon the block 161'. The blade 169' acts against the edge 167' to cut the wire and form the long wire J, while the blade 171' acts against the edge 168', to cut the wire and form the short wire I. It is thus seen that when the cross heads 150 and 147 move together, when the carriage 37 is indexed to the working position C, the wires of the stem will be severed to form the short and long wires I and J.

Means are provided to bend the U-shaped thermostatic element K, to further shape or size the same, so that its free side will be properly spaced from the adjacent wire J. This means is shown more clearly in Figures 2, 33, 34, and 35. This means comprises a stationary guide 159 which is rigidly mounted upon the top 20. The guide is horizontal and receives a slide 160, having a carriage 161 rigidly secured thereto, and projecting laterally therefrom. This carriage is provided with a track or guide 161b, receiving a slide 162. The slide 162 is urged forwardly with relation to the carriage 161 by a compressible coil spring 163, engaging a cross head 164, rigidly mounted upon the carriage 161. This cross head has a transverse opening for slidably receiving a rod 164', carrying nuts 165'. The rod 164' passes through the spring 163 and is tapped into the slide 162. The rod 164' limits the forward movement of the slide 162 with respect to the carriage 161. The forward end of the slide 162 has an opening 165 formed therein, and the ends 166 of the slide 162 is adapted to contact with the end of the carriage 37. Mounted upon the slide 162 is a block 165' having an opening 166' to receive the U-shaped element K. The numeral 167 designates a bell crank lever, one arm of which is pivoted upon the slide 162, by a pin 168, to swing horizontally. The other arm of the bell crank lever carries a transverse head 169, having spaced tines 170, to receive therebetween the long wire J and to engage with the long side of the element K and press the long side inwardly. An adjustable screw 171 is carried by the bell crank lever 167, to contact with the long wire J, and bend the same inwardly if necessary. The numeral 173 designates a longitudinally adjustable rod, having an enlarged screw threaded portion 174, adjustably mounted in a screw threaded opening formed in the cross head 164. By turning the rod 173 it may be longitudinally adjusted with relation to the cross head and carriage 161, and locked in the adjusted position by a nut 175. The adjustment of the rod 173 will control the movement of the lever 167. When the slide 162 and carriage 161, are in the normal position, a retractile coil spring 176 which is attached to the bell crank lever 167 and slide 162, will swing the bell crank lever rearwardly upon its pivot, so that it engages the rod 173, which limits the outward movement of the head 169. The slide 160 is provided at its rear end with a forked head 177, carrying a transverse pin 178, Figures 1 and 33, pivotally connected with a vertically swinging lever 179, mounted upon the fixed pivot 180 carried by a bracket 181. The lower end of the lever 179 pivotally engages a transverse pin 182, carried by a reciprocatory bar 183, operating within a fixed guide 184. The inner end of the bar 183 carries a roller 185, engaging a cam 186, rigidly mounted upon the lower end of the vertical shaft 27. It is thus seen that the cam 186 and associated elements move the slide 160 inwardly, and this slide is shifted outwardly by a retractile coil spring 187, which is attached to the slide and to a stationary post 188. It is thus seen that when the slide 160 and its carriage are positively moved forwardly, the slide 162 moves forwardly with the carriage, since the spring 163 is not now compressed. When the ends 166 of the slide 162 engage the carriage 37, the forward movement of the slide 162 is stopped, and further forward movement of the carriage 161 will compress the spring 163 and cause the rod 173 to swing the bell crank lever 167 upon its pivot 168, so that the head 169 will be shifted in a direction across the opening 165. The tines 170 will now engage the free or long side of the element K, bending and shaping the same. This side is permanently bent or formed so that it will be spaced the proper distance from the long wire J. If necessary the pin 171 will bend or shape wire J. When the carriage 161 is moved rearwardly the various elements are returned to their normal starting position. We contemplate inserting an arbor 166ᵃ in the U-shaped thermostatic element K when it is held within the opening or recess 166'. The jaw 169 will then press the free side of the element K against the arbor 166ᵃ. This will render the shaping more accurate. The arbor 166ᵃ would have to be vertically moved out of the path of travel of the element K when it is shifted into and removed from the recess 166'. Any suitable means may be employed to move the arbor 166ᵃ into and out of the opening or recess 166'.

Means are provided to lift the completed article from the holder, after the bending or sizing operation, and remove the same from proximity to such holder. This means is shown more particularly in Figures 29 to 32, 29ᵃ, and 33. This means comprises stationary tracks or guides 189, suitably mounted upon the top 20. These tracks or guides have horizontal grooves 190, slidably receiving the reduced ends of a horizontal transverse pin 191. This pin has a block 192 rigidly mounted thereon, and this block is slidable within an elongated slot 193, formed in a vertically swinging arm 194. This arm is rigidly mounted upon a rock shaft 195, mounted within fixed bearings 196, and a vertically swinging arm 197 is rigidly secured to the rock shaft 195, and is moved upwardly by a coil spring 198. The arm 197 carries a roller 199, engaging a cam 200, rigidly mounted upon the shaft 34. When the arm 194 is swung forwardly, the pin 191 is shifted forwardly upon the tracks 189. Arranged above the tracks 189 is an inclined body portion or carriage 201, provided at its rear end with spaced apertured knuckles 202, pivotally mounted upon the pin 191, and receiving the block 192 between them. One knuckle 202, Figure 32, has a pin 203 ragidly secured thereto, and this pin 203 contacts with the top of the adjacent rail 189, and limits the downward movement of the carriage 201. The same knuckle 202 is connected with a retractile coil spring 204, the lower end of which is attached to the arm 194. This spring tends to swing the carriage 201 downwardly. At its forward end, the carriage 201 has spaced normally horizontal tines 205 rigidly secured thereto and these tines are adapted to pass beneath the completed article for raising the same. One knuckle 202 has an inclined face 206, Figure 29 to contact with an adjustable stop 207, carried by a fixed block 208. This contact occurs above the pin 191 and hence serves to swing the carriage upwardly, after its tines 205 have moved horizontally beneath the article. Arranged above the carriage 201 is a stationary inclined chute 209, mounted upon stationary sides 210. At its forward upper end, this chute has its bottom cut away at 211, so that the raised tines 205 may transfer the article to the chute, to roll down the same.

After the bending or sizing operation is completed, arm 194 swings forwardly, and the pin 203 travels upon the rail 189, retaining the tines 205 horizontal until they engage beneath the article. After this, the inclined face 206 contacts with the stop 207, and the carriage 201 is swung upwardly, raising the tines 205, which transfers the article to the inclined chute. When the arm 194 moves rearwardly the reverse of this operation occurs.

As more clearly shown in Figure 23, the cross head 150 carries a leaf spring 212, which descends with this cross head and presses the article or stem downwardly, thus insuring that the wires I and J are in position, before they are severed. A nozzle 213, Figure 23, receives compressed air from a suitable source and blows air downwardly about the dies to retain them clear.

The operation of the machine is as follows:

The operator introduces the article into the holding means of the carriage 37, when this carriage is at the loading position A, and the forward ends of the wires I and J are in the leading position. The turret 23 is indexed and the same carriage 37 is brought to the idling position B, and the leading end of the carriage 37 is now rearward. The turret 23 is again indexed and the same carriage 37 is brought to the working position C. When the carriage is at this working position the cross heads 150 and 147 move together and the blades 169' and 171' sever the wires to produce the short wire I and the long wire J, see more particularly Figures 23 and 36. When the cross head 150 approaches the lowermost position, during the severing operation, the feeler 71 was moved by contact with the stem or article and the switch 70 closed. This caused the valve 68 to open, and the ribbon feed mechanism was accordingly operated. The ribbon 51 is now fed a step, Figure 36, and passes behind the reduced end 77 of the horn, which is now raised, and contacts with the rounded face 78 of this horn. The fed ribbon is disposed between the horn extension 77 and the forming bars 87, Figure 36. The forming bars 87 now move forwardly and press the ribbon 51 against the horn extension 77 before the ribbon is severed, whereby the ribbon will enter the forward ends of the grooves 87, before the ribbon is severed, since the ribbon would be slightly bowed. Further slight forward movement of the forming bars 87 causes the blade 110 to sever the ribbon, and the severed ribbon sections is formed about the horn extension 77, Figure 38, and enters the passage 88, since it is now formed into the U-shaped element K, and the sides of this U-shaped element are held within the grooves 87. These grooves prevent the severed ribbon section from falling out, after it is severed and before and after the ribbon section is completely formed. This step is shown in Figure 38. The forming bars 87 continue to move forwardly with respect to the horn extension 77, Figure 39, and this horn extension now moves downwardly to an elevation beneath the formed element K, while the transfer element 91 is moving forwardly with relation to the forming bars 87, Figures 39 and 40. The transfer element 91 engages the element K, Figure 40, and the forming bars 87 have now reached the end of their forward travel. Before the transfer element 91 moved the element K forwardly to any considerable extent, the arbor 118 was raised and also the welding electrodes 129 and 130. The transfer element 91 now moves the U-shaped element K upon the arbor extension 119, Figures 40 and 41, and yieldingly presses the element K upon the arbor extension 119, Figure 41. The electrode 129 now has its upper end disposed rearwardly of the arbor extension 119, Figures 40 and 41, and is positioned between the arms of the element K and inwardly of and adjacent to the short wire I and this short wire is arranged inwardly of and adjacent to one side of the element K, Figure 41. The upper end of the electrode 129 and the horizontal extension 131 of the electrode 130 have been raised and are disposed at the elevation of the wire I and the element K. With the parts thus arranged, Figure 41, the electrodes 129 and 130 are moved inwardly, by the rollers 136 and 137 engaging the cam block 140, Figure 6. These electrodes therefore press the wire I and the side of the element K firmly together, and while these parts are thus pressed together, the welding circuit is closed, and the wire I is welded to the side of the element K, the other side of the element K being disposed inwardly of the long wire J but not welded thereto. The foregoing operations occur while the cross heads 150 and 147 are moving apart. After the welding operation, the arbor and the electrodes descend to an elevation beneath the U-shaped element K. The turret 23 is now indexed to bring the article to the sizing and discharging position D. When the article is in this position the carriage 161 is moved toward the carriage 37 and the slide 162 moves with the carriage as a unit. When the ends 166 of the slide 162 contact with the carriage 37, further movement of the carriage 161 moves the rod 173 forwardly with respect to the slide 162 and this rod turns the bell crank lever 167 upon its pivot, and the tines 170 will engage the side of the element K adjacent to the long wire J, and bend such side from the wire J. This bending is sufficient to permanently shape or size the element K so that its side will be suitably spaced from the adjacent wire J. The long wire is also bent or shaped, if necessary, by the element carried by the bell crank lever 167. The carriage 161 is now shifted rearwardly so that the tines disengage the element K. While the article is still at the position D, and after the sizing operation, the tines 205 are shifted horizontally beneath the article, Figure 29, and subsequently swung upwardly, so that the article is introduced into the inclined chute 209 and will roll down the same. As shown in Figure 32ª, the thermostatic element K is welded to the wire I and its opposite arm is arranged to contact with the wire J. In Figure 32ᵇ, the modified thermostatic element K is welded to the wire I and the projection or rib K' is arranged to contact with wire J. This projection or rib K' is formed by the modified feeding jaws 55 and 56, Figure 21ᵇ.

It is to be understood that the form of our invention herewith shown and described is to be taken as a preferred example of the same and that various changes in the shape, size, and arrangement of parts may be resorted to without departing from the spirit of our invention or the scope of the subjoined claims.

Having thus described our invention, what we claim is:

1. In a welding machine, a supporting structure, a turret mounted upon the supporting structure, devices mounted upon the turret for holding stems having wires, means to index the turret so that each device is brought to a working position, a supporting and feeding device mounted upon the supporting structure near the working position for holding a metal ribbon, means mounted upon the supporting structure near the supporting and feeding device to form the metal ribbon into a substantially U-shaped element, said forming means including means to sever the metal ribbon, means mounted upon the supporting structure and arranged near the working position to receive and support the U-shaped element and hold one arm of the U-shaped element adjacent to the wire of the stem at the working position, and means mounted upon the supporting structure and arranged near the working position to press such arm against the wire and weld the arm to the wire.

2. In a welding machine, a supporting structure, a turret mounted upon the supporting structure, devices mounted upon the turret for holding stems having wires, means to index the turret so that each device is brought to a working position, a supporting and feeding device mounted upon the supporting structure and arranged near the working position for receiving a metal ribbon and holding the metal ribbon transversely of the wire at the working position, forming means mounted upon the supporting structure and arranged near the working position and including an element movable longitudinally of the wire at the working position and toward the wire to form the metal ribbon into a substantially U-shaped element and shift the substantially U-shaped element to bring one arm of the element adjacent to and upon the side of the wire, and means mounted upon the supporting structure to weld the arm to the wire.

3. In a welding machine, a supporting structure, a lower slide mounted upon the supporting structure and having a longitudinal opening and provided with a pair of spaced forming bars having a passage between them, a metal ribbon guide device mounted upon the supporting structure near the forward ends of the forming bars and having a ribbon receiving opening disposed transversely of the forming bars in advance of the forming bars when the forming bars are in the rear position, a vertically swinging horn pivotally mounted upon the supporting structure beneath the lower slide and having its forward end arranged for movement into and out of the passage between the forming bars, the metal ribbon being formed into a U-shaped element upon the forward end of the horn, an upper slide mounted upon the lower slide, a transfer element yieldingly connected with the upper slide and having a part arranged within said passage, a rotary driving element, driving connecting means between the rotary driving element and the lower slide, driving connecting means between the rotary element and the upper slide, and a cam part carried by the rotary element and controlling the operation of the horn.

4. In a welding machine, supporting means, a forming device mounted upon the supporting means and including spaced forming bars having a passage between them, said forming bars being provided upon their inner faces with longitudinal grooves, said grooves having a width for receiving a severed metal ribbon section and thereby holding the formed metal ribbon section, a metal ribbon guide mounted upon the supporting means and being positioned near the free ends of the forming bars and locating the severed metal ribbon section so that the formed metal ribbon section will enter the grooves, means to sever the ribbon to form the metal ribbon section, a movable horn arranged in advance of the ribbon, a movable mandrel arranged in advance of the horn, a transfer element having a part arranged within the passage between the forming bars, means to move the horn into and out of the path of travel of the transfer element, means to move the mandrel into and out of the path of travel of the transfer element, means to move the forming device and transfer element, means mounted upon the supporting means for holding an element having a metallic part and arranging the metallic part near the formed generally U-shaped element carried by the mandrel, and means to weld the generally U-shaped element to the metallic part while the metallic part is held upon the mandrel.

5. In a welding machine, supporting means, a forming device mounted upon the supporting means and including spaced forming bars having a passage between them, said forming bars being substantially horizontal and provided upon their inner faces with longitudinal grooves, said grooves having a width for receiving a severed metal ribbon section and thereby holding the formed metal ribbon section, a metal ribbon guide mounted upon the supporting means and positioned near the free ends of the forming bars and holding the metal ribbon with its transverse axis substantially vertical and locating the severed metal ribbon section so that the formed metal ribbon section will enter the grooves, means to sever the ribbon to form the metal ribbon section, a movable horn arranged in advance of the ribbon, a movable mandrel arranged in advance of the horn, a transfer element having a part arranged within the passage between the forming bars, means to move the horn into and out of the path of travel of the transfer element, means to move the mandrel into and out of the path of travel of the transfer element, means to move the forming device and transfer element, means mounted upon the supporting means for holding an element having a metallic part and arranging the metallic part near the formed element carried by the mandrel, and means to weld the formed element to the metallic part while the formed element is held upon the mandrel.

6. In a welding machine, supporting means, a forming device mounted upon the supporting means and including a pair of spaced substantially horizontal forming bars having a passage between them, said forming bars being provided upon their inner faces with longitudinal grooves which extend through the forward ends of the bars, said grooves having a width for receiving a severed metal ribbon section, a metal ribbon guide mounted upon the supporting means and holding the metal ribbon with its transverse axis substantially vertical and locating the severed metal ribbon section in advance of and transversely of the forming bars and passage, means to sever the metal ribbon to form the metal ribbon section, a vertically movable horn arranged in advance of the ribbon, a vertically movable mandrel arranged in advance of the horn, a transfer element operating within the passage between the forming bars, means to move the horn into and out of the path of travel of the transfer element and then move the mandrel into the path of travel of the transfer element, means to move the forming device and transfer element forwardly together so that the severed metal ribbon section is formed into an element upon the horn and to also move the transfer element forwardly with relation to the forming bars before the forming bars are moved rearwardly so that the transfer element will then press the formed element upon the mandrel, means for holding an element having a metallic part and locating the metallic part near one side of the formed element, and means to weld the formed element to the metallic part.

7. In a welding machine, supporting means, a forming device mounted upon the supporting means and including a pair of spaced forming bars having a passage between them, a metal material guide mounted upon the supporting means and arranged to hold the metal material in advance of and transversely of the forming bars when the forming bars are in the rear position, a movable horn arranged in advance of the metal material, a movable mandrel arranged in advance of the horn, a transfer element connected with and movable longitudinally of the forming bars, means to move the horn out of the path of travel of the transfer element and then move the mandrel into the path of travel of the transfer element, means to move the forming device and transfer element forwardly together so that the metal material is formed into an element upon the horn and to also move the transfer element forwardly with relation to the forming bars before the forming bars are moved rearwardly so that the transfer element will then press the formed element upon the mandrel, means for holding a metallic element near the formed element, and means to weld the formed element to the metallic element.

8. In a welding machine, supporting means, a forming device mounted upon the supporting means and including a pair of spaced forming bars having a passage between them, a metal ribbon guide mounted upon the supporting means and arranged to hold the metal ribbon in advance and transversely of the forming bars when the forming bars are in the retracted position, a movable horn separate from the forming device and arranged in advance of the ribbon, a movable mandrel separate from the forming device and arranged in advance of the horn, the horn and mandrel being in substantial alignment with the passage when they are in the active position, a transfer element connected with and movable longitudinally of the forming bars, means to move the horn into and out of the path of travel of the transfer element and the mandrel into and out of the path of travel of the transfer element, means to move the forming device and transfer element forwardly together so that the metal ribbon is formed into an element upon the horn and to also move the transfer element forwardly with relation to the forming bars before the forming device is moved rearwardly so that the formed element is applied to the mandrel, means for holding a metallic part near the formed element applied to the mandrel, and means to weld the formed element to the metallic part while the U-shaped element is mounted upon the mandrel.

9. In a welding machine, supporting means, a forming device mounted upon the supporting means and including a pair of spaced forming bars having a passage between them, a metal material guide mounted upon the supporting means and arranged to hold the metal material in advance and transversely of the forming bars when the forming bars are retracted, a movable horn mounted upon the supporting means and separate from the forming device and arranged in advance of the metal material, a movable mandrel mounted upon the supporting means and separate from the forming device and arranged in advance of the horn, the horn and mandrel being in substantial alignment with the passage when they are in the active positions, a transfer element connected with and movable longitudinally of the forming device, means to move the forming device forwardly toward the horn to form the metal material into an element, means to move the transfer element forwardly with relation to the forming device before the forming device is moved rearwardly, the transfer element transferring the formed element to the mandrel, means for supporting a metallic part near the formed element carried by the mandrel, and means to weld the formed element to the metallic part while the formed element is carried by the mandrel.

10. In a welding machine, supporting means, a reciprocatory base slide mounted upon the supporting means, spaced forming bars carried by the base slide to move therewith and having a passage between them, a transfer element mounted upon the base slide and having a part extending into the passage, an operating slide mounted upon the base slide and connected with the transfer element, a cam mounted upon the operating slide, a metal ribbon guide mounted upon the supporting means and arranged to hold the metal ribbon in advance of the forming bars when they are attracted, a movable horn mounted upon the supporting means and arranged in advance of the ribbon, a movable mandrel mounted upon the supporting means and arranged in advance of the horn, the horn and mandrel being in substantial alignment with the passage when in the active position, means to move the horn into and out of the path of travel of the transfer element, means to move the mandrel into and out of the path of travel of the transfer element, means to move the base slide and operating slide, means for holding an element having a metal part and arranging the metal part near the formed element, welding elements connected with the mandrel to move therewith, and means to move the welding elements toward each other including pivoted levers operated by the cam.

11. In a welding machine, supporting means, a reciprocatory base slide mounted upon the supporting means, spaced forming bars carried by the base slide and extending longitudinally thereof and having a passage between them, a transfer element mounted upon the base slide and having a part extending into the passage, an operating slide mounted upon the base slide, a resilient connection between the transfer element and operating slide, cam means mounted upon the operating slide, a metal ribbon guide mounted upon the supporting means and arranged to hold the metal ribbon in advance and transversely of the forming bars when the forming bars are in the retracted position, a movable horn mounted upon the supporting means and separate from the forming bars and arranged in advance of the ribbon, a movable mandrel mounted upon the supporting means and separate from the forming bars and arranged in advance of the horn, the horn and mandrel being in substantial alignment with the passage when in the active position, means to move the horn into and out of the path of travel of the transfer element, means to move the mandrel into and out of the path of travel of the transfer element, means to move the base slide and operating slide forwardly together and to also move the operating slide forwardly with relation to the base slide before the base slide is moved rearwardly, means for holding an element having a metal part and arranging the metal part close to the formed element transferred to the mandrel, means to weld the formed element to the metal part, and means operated by the cam means for operating the welding means.

12. In a welding machine, a forming device including spaced forming bars having a passage between them, a metal material guide arranged near the free ends of the forming bars, means to sever the metal material, a movable horn arranged in advance of the metal material, a movable mandrel arranged in advance of the horn, a transfer element having a part arranged within the passage between the forming bars, means to move the horn into and out of the path of travel of the transfer element, means to move the mandrel into and out of the path of travel of the transfer element, means to move the forming device to form the element upon the horn, means to move the transfer element for transferring the formed element to the mandrel, means for supporting an article having a metal part, the mandrel holding the formed element near the metal part, and means to weld the formed element to the metal part while the formed element is held upon the mandrel.

13. In a welding machine, a forming device including spaced forming bars having a passage between them, a movable horn arranged in advance of the forming device, a movable mandrel arranged in advance of the horn, a transfer element carried by the forming device and having a part operating within the passage between the forming bars, means for holding metal material between the forming bars and horn, means to move the forming device toward the horn so that the element is formed upon the horn, means to move the horn out of contact with the formed element, means to move the transfer element for transferring the formed element to the mandrel and holding the formed element upon the mandrel, means for supporting an article having a metal part, the mandrel arranging the formed element near the metal part, means for welding the formed element to the metal part while the formed element is held upon the mandrel, and means to move the mandrel to separate the same from the formed element.

14. In a welding machine, a forming device including spaced forming bars having a passage between them, a movable horn arranged in advance of the forming device, a mandrel arranged in advance of the horn, means to move the forming device forwardly toward the horn so that an element is formed upon the horn from metal material arranged between the horn and forming bars, means to move the horn out of contact with the formed element and leaving the formed element held between the forming bars, means engaging the formed element within said passage and movable forwardly for transferring the formed element to the mandrel which is arranged in advance of the horn, means for supporting an article having a metal part, the mandrel arranging the formed element near the metal part, and means for welding the formed element to the metal part while the formed element engages the mandrel.

15. In a welding machine, a forming device including spaced forming bars having a passage between them, a movable horn arranged in advance of the forming device, means to move the forming device forwardly toward the horn so that an element is formed upon the horn from metal material arranged between the horn and forming bar, a mandrel spaced from the horn, means to move the horn out of contact with the formed element, means engaging the formed element within the passage and transferring the formed element to the mandrel and clamping the formed element against the mandrel, means for supporting an article having a metal part, the mandrel arranging the formed element near the metal part, and means for welding the formed element to the metal part while the formed element engages the mandrel.

ALBERT F. PITYO.
HARRY E. BUTTERFIELD, Jr.

REFERENCES CITED

The following references are of record in the file of this patent:

UNITED STATES PATENTS

| Number | Name | Date |
|---|---|---|
| 397,991 | Manson | Feb. 19, 1889 |
| 515,300 | Monahan | Feb. 20, 1894 |
| 887,630 | Hart | May 12, 1908 |
| 1,262,334 | Handke | Apr. 9, 1918 |
| 1,370,387 | Voshardt | Mar. 1, 1921 |
| 1,620,354 | Jones et al. | Mar. 8, 1927 |
| 1,655,279 | McGowan | Jan. 3, 1928 |
| 2,005,375 | Jones et al. | June 18, 1935 |
| 2,006,459 | Jones et al. | July 2, 1935 |
| 2,037,838 | Van Uum et al. | Apr. 21, 1936 |
| 2,052,356 | Long | Aug. 25, 1936 |
| 2,077,335 | Lemming | Apr. 13, 1937 |
| 2,114,844 | Krause | Apr. 19, 1938 |
| 2,140,019 | Lewis | Dec. 13, 1938 |
| 2,169,251 | Johnson | Aug. 15, 1939 |
| 2,329,769 | Kinyon | Sept. 21, 1943 |
| 2,419,484 | Danzinger | Apr. 22, 1947 |
| 2,447,499 | Erk | Aug. 24, 1948 |